United States Patent [19]

Farris

[11] Patent Number: 5,541,917
[45] Date of Patent: Jul. 30, 1996

[54] VIDEO AND TELCO NETWORK CONTROL FUNCTIONALITY

[75] Inventor: Robert D. Farris, Sterling, Va.

[73] Assignee: Bell Atlantic, Arlington, Va.

[21] Appl. No.: 302,472

[22] Filed: Sep. 12, 1994

[51] Int. Cl.$^6$ .................................................. H04L 12/56
[52] U.S. Cl. .................... 370/60.1; 370/68.1; 370/110.1; 379/105; 379/220; 379/230; 379/246
[58] Field of Search ........................ 379/230, 112, 379/245, 246, 247, 94, 105, 122, 212, 220, 59; 370/60.1, 60, 68.1, 110.1, 110.2, 110.3, 58.1, 58.3, 85.13, 94.1

[56] References Cited

U.S. PATENT DOCUMENTS

| | | | |
|---|---|---|---|
| 4,506,387 | 3/1985 | Walter | 348/10 |
| 4,763,191 | 8/1988 | Gordon et al. | 379/91 |
| 4,949,187 | 8/1990 | Cohen | 348/3 |
| 4,963,995 | 10/1990 | Lang et al. | 348/384 |
| 5,027,400 | 6/1991 | Baji et al. | 380/20 |
| 5,057,932 | 10/1991 | Lang et al. | 348/384 |
| 5,115,426 | 5/1992 | Spanke | 370/60 |
| 5,130,792 | 7/1992 | Tindell et al. | 379/96 |
| 5,132,992 | 7/1992 | Yurt et al. | 375/240 |
| 5,133,079 | 7/1992 | Ballantyne et al. | 455/41 |
| 5,241,588 | 8/1993 | Babson, III et al. | 379/201 |
| 5,247,347 | 9/1993 | Litteral et al. | 379/105 |
| 5,247,571 | 9/1993 | Kay et al. | 370/60.1 |
| 5,253,275 | 10/1993 | Yurt et al. | 375/240 |
| 5,278,889 | 1/1994 | Papanicolaou et al. | 379/53 |
| 5,384,771 | 1/1995 | Isidoro et al. | 370/58.2 |

OTHER PUBLICATIONS

Bell Atlantic, Request for Quotation, No. 93JJM0242, Dec. 7, 1994.

Primary Examiner—Hassan Kizou
Assistant Examiner—Seema S. Rao
Attorney, Agent, or Firm—Lowe, Price, LeBlanc & Becker

[57] ABSTRACT

To efficiently provide a variety of different services, e.g. voice grade telephony, packet data services, and broadband services, through an integrated network, at least some routing functions relating to all of the different types of services are controlled by data stored in a single central controller. Nodes or switching points performing the routing functions for the different types of services recognize certain call processing events as triggers. In response to a trigger, such a switching point will suspend processing of the particular call and obtain routing instructions from the central controller as to how to complete call processing.

30 Claims, 7 Drawing Sheets

VIDEO AND TELCO NETWORK CONTROL FUNCTIONALITY

TECHNICAL FIELD

The present invention relates to an integrated dial tone network, controlled by an Integrated Service Control Point (ISCP), to perform various functions related to providing subscribers an array of voice, data and broadband services. Various switch points of the network which provide voice, packet data or broadband (video) switching or combinations thereof all are equipped as Service Switching Points (SSP's) to communicate with and respond to control data from the ISCP.

BACKGROUND

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, FCC regulation required the CATV industry to provide local access and original programming in addition to off-air broadcast signal distribution.

In response, several sources of cable network programming evolved. Because of the wide bandwidth available on cable television systems, additional channels were available for the new programming. However, programming was generally prescheduled, with the viewer left to tune to the designated channel at the appointed time to view a particular program.

To increase revenues, cable television systems have initiated distribution of premium channels viewable only by subscribers having appropriate descramblers. The subscriber tunes the descrambler to receive a premium channel, descramble the video and audio information and supply a signal capable of reception on a standard television set. Pay-per-view programs, which evolved later, include recently released movies, live concerts and popular sporting events. Subscribers wishing to view a pay-per-view program place an order with the cable operator. At the designated time, the subscriber's descrambler is activated by some control from the cable operator to permit viewing of the pay-per-view programming. However, the subscriber is still restricted to viewing the programming at the scheduled time. There is no capability of delivering programming to a subscriber on demand, that is, immediately or at a subscriber-specified time and date.

More recently, several different wideband digital distribution networks have been proposed for offering subscribers an array of video services, including true Video On Demand service. The following U.S. Patents disclose representative examples of such digital video distributions networks: Yurt et al. U.S. Pat. No. 5,253,275, Yurt et al. U.S. Pat. No. 5,132,992, Ballantyne et al. U.S. Pat. No. 5,133,079, Tindell et al. U.S. Pat. No. 5,130,792, Lang U.S. Pat. No. 5,057,932, Lang U.S. Pat. No. 4,963,995, Cohen U.S. Pat. No. 4,949,187, Baji et al. U.S. Pat. No. 5,027,400, and Walter U.S. Pat. No. 4,506,387. In particular, Litteral et al. U.S. Pat. No. 5,247,347 discloses a digital video distribution network providing subscribers with access to multiple service providers through the public switched telephone network.

As the digital networks evelove to provide equal access to multiple service providers, the network functionality approaches a video "dial tone" network functionality somewhat analogous to the dial tone call-up functionality available through the telephone network. FIG. 6 is a block diagram of one type of broadband network for providing telephone service as well as interactive services, such as video on demand, home shopping or purchasing, home banking, medical information, ticket ordering, gaming, etc. from a plurality of service providers. The illustrated network is an improvement over the network disclosed in the above noted Litteral et al. Patent.

In the network shown in FIG. 6, the customer premises equipment (CPE) consists of a set top terminal type Digital Entertainment Terminal (DET) 700 and a telephone (POTS or ISDN). The connections to the network utilize Asymmetrical Digital Subscriber Line (ADSL) frequency division multiplexing technology, typically over twisted wire pair. The ADSL connection provides a 1.5 Mb/s downstream video information channel, a two-way telephone connection and a two-way 16 kbit/s control channel. The ADSL technology is described in more detail in the Litteral et al. Patent. The illustrated Video Dial Tone network architecture may use some form of fiber extension in the actual subscriber loops, to provide services to subscribers located more than 1.5 kilo-feet from a central office (see e.g. U.S. patent application Ser. No. 08/233,579, in the name of Bruce Kostreski, filed Apr. 26, 1994, 1994 and entitled "Extended Range Video On Demand System". In the illustrated network, the drop to the subscriber's premises is always a wired ADSL loop.

In the network of FIG. 6, the DET 700 connects to an ADSL multiplexer/demultiplexer 701 similar to the in-home ADSL unit in the above discussed Litteral et al. Patent. Each ADSL subscriber line 703 will connect to an ADSL bay 705 located in or associated with the subscriber's local telephone company central office. For each subscriber line 703, the ADSL bay 705 includes an ADSL multiplexer/demultiplexer similar to the central office ADSL unit in the above discussed Litteral et al. Patent.

The ADSL bay 705 provides transport for voice signals on the subscriber loop to and from the associated voice switch 707. The ADSL bay 705 also connects to an access concentrator 709 for providing two-way signaling connections through an X.25 type packet switched data network 711. The ADSL bay 705 also receives broadband digital signals for downstream transport over the ADSL line 703 to each subscriber's premises from a digital cross connect switch 713, labelled "Access DCS" in the drawing. One ADSL line to the home carries one channel of video programming and provides a single output channel. The output channel can provide a video signal to a VCR or to the TV set 700'. The various Access DCS switches throughout the network are controlled by switch controller 712.

If the ADSL bay 705 is local, i.e. located in the same telephone company central office as the cross connect switch DCS 713, the ADSL bay 705 connects to the Access DCS 713 via an appropriate number of local DS1 connections 715. In service areas where an ADSL bay does not carry enough traffic to warrant an associated Access DCS, the ADSL bay will be located in a remote central office facility. Such a remote ADSL bay connects to the Access DCS 713 via a SONET type optical fiber link 717 providing an appropriate number of multiplexed channels to service the number of subscribers connected to the particular ADSL bay.

The Access DCS 713 provides both point-to-point connections and point-to-multipoint connections. Individualized interactive services, such as Video On Demand, home shopping/purchasing and banking, use point-to-point connections wherein the Access DCS connects one broadband input port from a VIP's server to one output port going to the subscriber's ADSL line. Narrowcast and broadcast services utilize point-to-multi-point connections of one input port to a plurality of output ports.

The illustrated architecture of the Video Dial Tone network utilizes two levels of gateways, both of which will communicate with subscribers' DET's via the X.25 data network 711 and the signaling channel on the ADSL subscriber loops 703. The level 1 gateway 721 performs a variety of network connectivity related functions, including communications port management of transmissions of information between subscribers and servers, processing of billing information and session management. A level 2 gateway provides a number of services for the Information Providers. These services include transmission of menus of available information to subscribers, searches of available information, targeted advertisement insertion, previews, trailers, control of an associated file server, etc.

The Video Dial Tone network of FIG. 6 provides video on demand and closely related interactive multimedia services. For example, using the upstream data channel, the subscriber can send a request for a particular movie, and the VIP's server will retrieve and transmit that movie as an MPEG digital data stream on the 1.5 Mb/s downstream channel to the digital audio/video processor in the subscriber's DET 700. The DET converts the digital data stream to a signal for driving a standard television set for real time viewing of the movie by the subscriber.

When the subscriber turns on the DET 700, the loader routine and/or operating system within the DET will control wake up, and the DET will transmit an initial message intended for the level 1 gateway. In the network of FIG. 6, the message is carried over the 16 kbit/s signaling channel on the ADSL subscriber's line. The access concentrator 709 uses the X.121 address of the level 1 gateway 721 and the X.121 address associated with the calling subscriber's line 703 to initiate an X.25 packet data call to the level 1 gateway 721. As part of this call, the access concentrator 709 packetizes each message from the DET 700 and adds header information to facilitate transport through an assigned virtual circuit through the X.25 network 711 to the gateway 721. In response to the initial message, the level 1 gateway 721 transmits ASCII text representing one ore more pages of a VIP selection menu back to the DET 700 through the assigned virtual circuit through the X.25 network 711 and the signaling channel on the subscriber's line 703. Upon receipt of the menu data, the DET 700 would display an initial selection menu on the subscriber's television set 700'.

The subscriber may review the menu on their television set, and then input a selection using the infrared remote control device, either by moving a cursor to an appropriate point on the screen and hitting <ENTER> or by inputting digits followed by <ENTER>. In response to the VIP selection input, the DET 700 will transmit an appropriate data signal upstream through the network to the level 1 gateway 721.

As part of the X.25 call set up procedure, the access concentrator 709 identified the subscriber and included an X.121 address for the X.25 network port assigned to the subscriber in the initial signaling packet sent through the X.25 network. The level 1 gateway 721 receiving X.25 packets of DET signaling data therefore knows the X.121 address of the calling subscriber. The level 1 gateway 721 uses that information together with the VIP selection input to initiate an X.25 data call to the VIP's level 2 gateway to ask if the subscriber is a valid customer of the particular VIP. If the level 2 gateway indicates that the subscriber is valid, the level 1 gateway 721 initiates a call through switch controller 712 to instruct the appropriate digital cross connect switch DCS 713 to set up a downstream broadband link from the VIP's file server to the subscriber's DET 700 and drops the X.25 communication link to the DET. At approximately the same time, the VIP's level 2 gateway initiates an X.25 packet data call to the subscriber's DET 700. Completion of set-up of both the broadband link and the X.25 signalling link to the DET establishes an interactive video session between the VIP's gateway and server system 752 and the subscriber's DET 700.

Once a session is established, the level 2 gateway executes a two-way communication with the DET 700 through the X.25 network 711 and the signaling channel to obtain a selection or other relevant input from the subscriber. In response, the level 2 gateway provides a signal to the associated file server instructing the server to initiate transmission of selected audio/video program materials from memory through the output port which the DCS 713 has currently connected to the subscriber's line 703. The connection through the DCS routes the downstream broadband transmission to the ADSL bay 705, and within that bay, to the ADSL multiplexer/demultiplexer serving the subscriber's line for transmission over the line 703. The ADSL multiplexer/demultiplexer 701 demultiplexes the broadband signal carrying MPEG encoded audio/video material and applies that signal to the subscriber's DET 700 for decoding and display on the television set 700'.

A more detailed description of the network of FIG. 6, with particular emphasis on the network control functionality of the level 1 gateway, appears in commonly assigned U.S. patent application Ser. No. 08/304,174 filed on Sep. 12, 1994 entitled "LEVEL 1 GATEWAY FOR VIDEO DIAL TONE NETWORKS", the disclosure of which is incorporated herein in its entirety by reference.

Although the final drop into the subscriber's home is over telephone lines and some of the network equipment resides in telephone company central office buildings, the prior art video dial tone network makes no use whatsoever of routing control functionality of the existing telephone network. The gateways and servers are all separate components newly developed and added over and above the telephone network. Development and deployment of such new equipment adversely impacts the cost of implementing the video dial tone network.

Also, the use of gateways in the manner discussed above results in multiple call switching to set up each individual interactive broadband session between a service provider (VIP) and the subscriber's DET. Specifically, the X.25 communication between the DET and the level 1 gateway is a first call. The X.25 communication between the level 1 and level 2 gateways to determine the validity of the calling subscriber is a second call. The switch controller 712 typically comprises another data communication system to permit the level 1 gateway to control a plurality of DCS switches. The instruction to set up a broadband link through a selected DCS therefore may also be viewed as another data call, i.e. between the level 1 gateway and the particular DCS 713 which will provide the switched broadband connection. The two-way X.25 signaling connection between the level 2 gateway and the subscriber's DET would be a fourth call, and the fifth and final call through the network would be the actual broadband link downstream from the server to the DET. Such multiple switching is an inefficient use of resources and consumes excessive time during initial set-up of sessions between the DET and the service provider's equipment.

Concurrent with recent developments in digital distribution of broadband services outlined above, the telephone industry has been developing an enhanced telephone network, sometimes referred to as an Advanced Intelligent Network (AIN), for providing a wide array of new voice grade telephone service features (see for example commonly assigned U.S. Pat. No. 5,247,571). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signalling (CCIS) link to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

An AIN type network for providing an Area Wide Centrex service, for example, was disclosed and described in detail in commonly assigned Kay et al. U.S. Pat. No. 5,247,571, the disclosure of which is entirely incorporated herein by reference. Babson, III et al. U.S. Pat. No. 5,241,588 discloses graphical approaches to creating and implementing new customer service procedures for individual customers of an intelligent telephone network.

To date, the AIN telephone network has been a separate technical area of development, with at most limited interaction between the AIN and the video networks. For example, Gordon et al. U.S. Pat. No. 4,763,191 discloses a method for providing a nationwide dial-a-view service in which a caller desiring a given viewing selection dials an INWATS "800" dial-a-view number for ordering that selection through the telephone networking arrangement. A central data base system provides the originating toll office with routing instructions for sending the request to network services equipment. The network services equipment acknowledges the caller's request for cable services and processes the dial-a-view request. The network services equipment provides relevant data to cable television distribution equipment to control actual supply of requested programming to the calling subscriber. Separate vendor equipment supplies the requested programming to the calling customer via activation of an addressable decoder at the calling customer's television. The telephone network components still do not directly control actual routing of program materials through the broadband network.

As another example, Papanicolaou et al. U.S. Pat. No. 5,278,889 discloses a two-way video telephone system using a combination of a two-way cable television distribution system and an intelligent voice telephone network. The video distribution networks used apparently are existing frequency division multiplexed analog transmission systems. As part of the disclosed call processing, a central database responds to video telephone call dialing information by providing instructions to the network to route the video portion of the call through a digital inter-exchange carrier network between points of presence of two of the cable television distribution networks.

From the above discussion of the prior art it becomes clear that a need still exists to more closely integrate elements of the existing AIN telephone network with the new video dial tone and packet data networks, particularly for purposes of providing a uniform control of all routing through the integrated network.

Disclosure of the Invention

The present invention addresses the above needs by controlling various nodes or switching points in the network, which perform routing functions for each of the different types of services, from a central controller. The various nodes all are capable of recognizing certain call processing events as triggers. In response to a trigger, such a switching point will suspend processing of the particular call and obtain routing instructions from the central controller as to how to complete call processing. Thus, the invention relates to methods, networks and network components for providing centralized control of an integrated network offering at least voice grade telephone services and broadband communication services and preferably switched packet data services as well.

A first aspect of the invention relates to an integrated communication system of the advanced intelligent network (AIN) type. The system includes a telephone central office switching system and at least one local router. In addition to selectively providing switched telephone call communications services to a plurality of telephone stations coupled thereto, the telephone central office switching system detects triggering events during processing of certain telephone calls.

In the preferred embodiment described in detail below, the local router is often referred to as a host digital terminal or "HDT". The local router selectively provides switched telephone call communications services to a plurality of telephone stations coupled thereto. The local router also selectively provides broadband digital services to a plurality of digital terminals coupled thereto. As with the telephone central office switching system the local router is capable of detecting triggering events. Broadly, the router detects such events during set up of at least some of the selective broadband digital services. In the preferred embodiment described in detail below, the local router detects trigger events during processing of voice telephone calls and packet data calls, as well.

The inventive communication system also includes a central data base, separate from the telephone central office switching system and the local router. This data base stores data for generating control signals for controlling at least some of the telephone call communications services provided by the telephone central office switching system and at least some of the selective broadband digital services provided by the local router. A signaling communication system, separate from the trunk circuits, carries two-way signaling data between the central data base and the telephone central office switching system and the local router. The telephone central office switching system and the local router each obtain control signals from the central data base via the signaling communication system in response to detection of triggering events. In the preferred embodiments, the signaling communication system is the common channel interoffice signaling system (CCIS) used by the existing public switched telephone network.

The control of the broadband service routing in essentially the same manner as AIN type telephone call routing eliminates the multiple calls needed to set up a broadband session in the prior art network of FIG. 6. In particular, these inventive procedures eliminate the need for an interactive provider to confirm to the network that a caller is a subscriber and then initiate both a signaling call and a broadband call back through the network as new calls to the identified subscriber's terminal in order to set up the various links necessary for an interactive session.

From a subscriber's perspective broadcast channel selection appears identical to channel selection in a CATV like broadcast environment. Calling an interactive service provider or a packet data service provider appears functionally identical to calling or dialling up another party for a voice grade telephone call. Also, the subscriber can use a single digital terminal for both packet data and broadband services.

In another aspect, the invention comprises a broadband call processing method in an integrated communication system. The system includes a broadband communication network, information servers connected to the broadband communication network to transmit broadband digital information via a link through that network, subscriber terminals, telephone switching offices, and a central control. The central control is separate from the telephone switching offices, but it controls at least some operations of each telephone switching office. The inventive method begins with reception of a selection signal from one of the terminals at a node of the broadband communication network. In response to the selection signal, data stored in the central control is accessed to generate broadband control instructions. The accessed control data is used to control an operation of the broadband communication network to enable the one terminal to receive broadband digital information from a predetermined one of the information servers which provides the selected service.

This AIN type call processing methodology can be applied to control routing for a variety of broadband services available through the network. For example, if the selected service is a broadcast service, the control data might indicate whether or not the subscriber is in fact entitled to receive the selected program. This methodology would also control routing to the level 2 gateway and broadband server operated by a selected interactive service provider. The subscriber enters a single provider selection and the control data provides the information necessary to set up both the two-way signaling link and the broadband link.

In other aspects, the invention relates to specific broadband processing elements of the network adapted to recognize triggers and communicate with the central controller.

For example, one inventive element is a local router. The router comprises at least one trunk interface and at least one line interface. A switching system in the router provides telephone and broadband switching of signals between the trunk interface and the line interface. The router also includes a processor which controls the switching system. The processor recognizes an event relating to selection of a broadband service as a trigger. A signaling communication device is responsive to the processor for obtaining instructions from the central controller instructing the processor how to control at least one broadband switching operation in response to the trigger.

As another example, another element of the inventive network is a broadband switching system. This inventive system includes a trunk interface, a line interface and a broadband switch fabric. The broadband switch fabric, such as an Asynchronous Transfer Mode (ATM) routing system, selectively routes broadband signals between the trunk interface and the line interface. The inventive system also includes a processor which controls the broadband switch fabric and recognizes an event relating to selection of service through the broadband switch system as a trigger event. An associated signaling communication device is responsive to the processor for obtaining instructions from the central controller instructing the processor how to control the switch fabric in response to the trigger event.

The integrated control of telephone and broadband communications facilitates a variety of new services. In one such inventive service, a video program can have an associated telephone number. For example, a shopping program might advertise an existing 800 number that viewers use to call in and order advertised products. With the invention, a viewer operates his terminal to indicate a desire to call in. In response to the input from the subscriber, the terminal transmits a message to a node of the broadband network, for example upstream to the local router or HDT. A query is transmitted from the node to the central controller. The query identifies the subscriber and the transmitted video signals (i.e. the program being viewed). In response to the query, the central controller identifies a destination telephone number assigned to a provider of the service and a telephone number assigned to the subscriber. The central controller then provides instructions to appropriate switching points of the integrated network to ring a telephone station corresponding the destination telephone number assigned to the provider of the service and a telephone station corresponding to the telephone number assigned to the subscriber. When both parties answer at the respective telephone stations, components of the network provide a voice grade telephone communication between both telephone stations.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Acronyms

The following detailed description uses a large number of acronyms to refer to various services and system components. Although known, use of several of these acronyms is not strictly standardized in the art. For purposes of this discussion, acronyms therefore will be defined as follows:

Advanced Intelligent Network (AIN)
Asynchronous Transfer Mode (ATM)
Central Office (CO)
Common Channel Inter-office Signaling (CCIS)
Data and Reporting System (DRS)
Digital Entertainment Terminal (DET)
Dual Tone Multifrequency (DTMF)
Host Digital Terminal (HDT)
Integrated Service Control Point (ISCP)
Integrated Service Digital Network (ISDN)
Interworking Unit (IWU)
Moving Picture Experts Group (MPEG)
Multi-Services Application Platform (MSAP)
Optical Network Unit (ONU)
Permanent Virtual Circuit (PVC)
Plain Old Telephone Service (POTS)
Service Control Point (SCP)
Service Creation Environment (SCE)
Service Management System (SMS)
Service Switching Point (SSP)
Signaling System 7 (SS#7)
Signaling Transfer Point (STP)
Telephone Operating Company (TELCO)
Transaction Capabilities Applications Protocol (TCAP)
Virtual Circuit Identifier/Virtual Path Identifier (VCI/VPI)
Video Information Provider (VIP)
Video Information User (VIU=subscriber)

BEST MODE FOR CARRYING OUT THE INVENTION

Figure 1A:
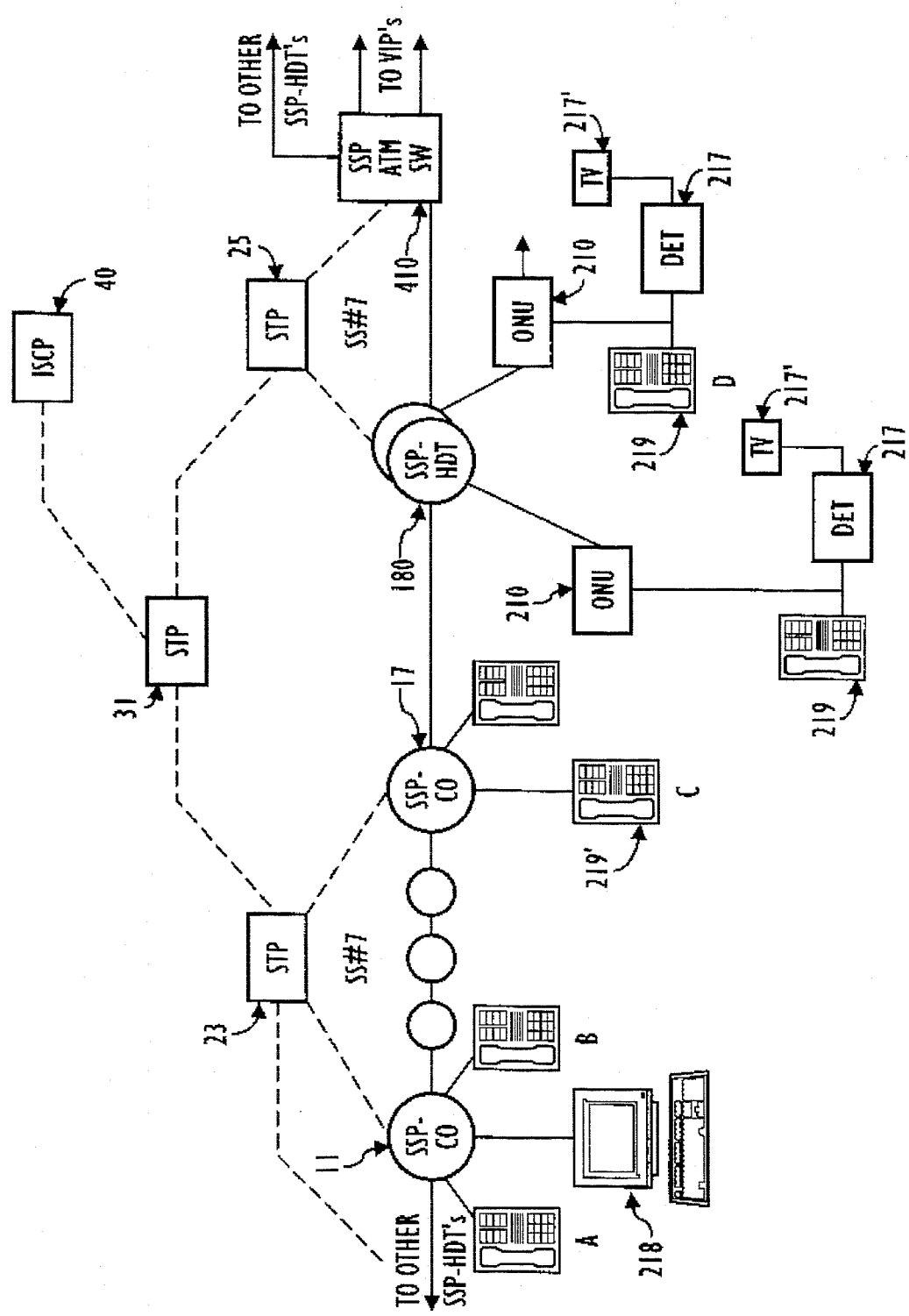
FIG. 1A is a schematic block diagram of an integrated Advanced Intelligent Network (AIN), in accord with the present invention, for providing voice, packet switched data and broadband (video) services. This drawing illustrates the telephone communication portion of the network in detail and provides a simplified functional illustration of some of the broadband network components.
Figure 1B:
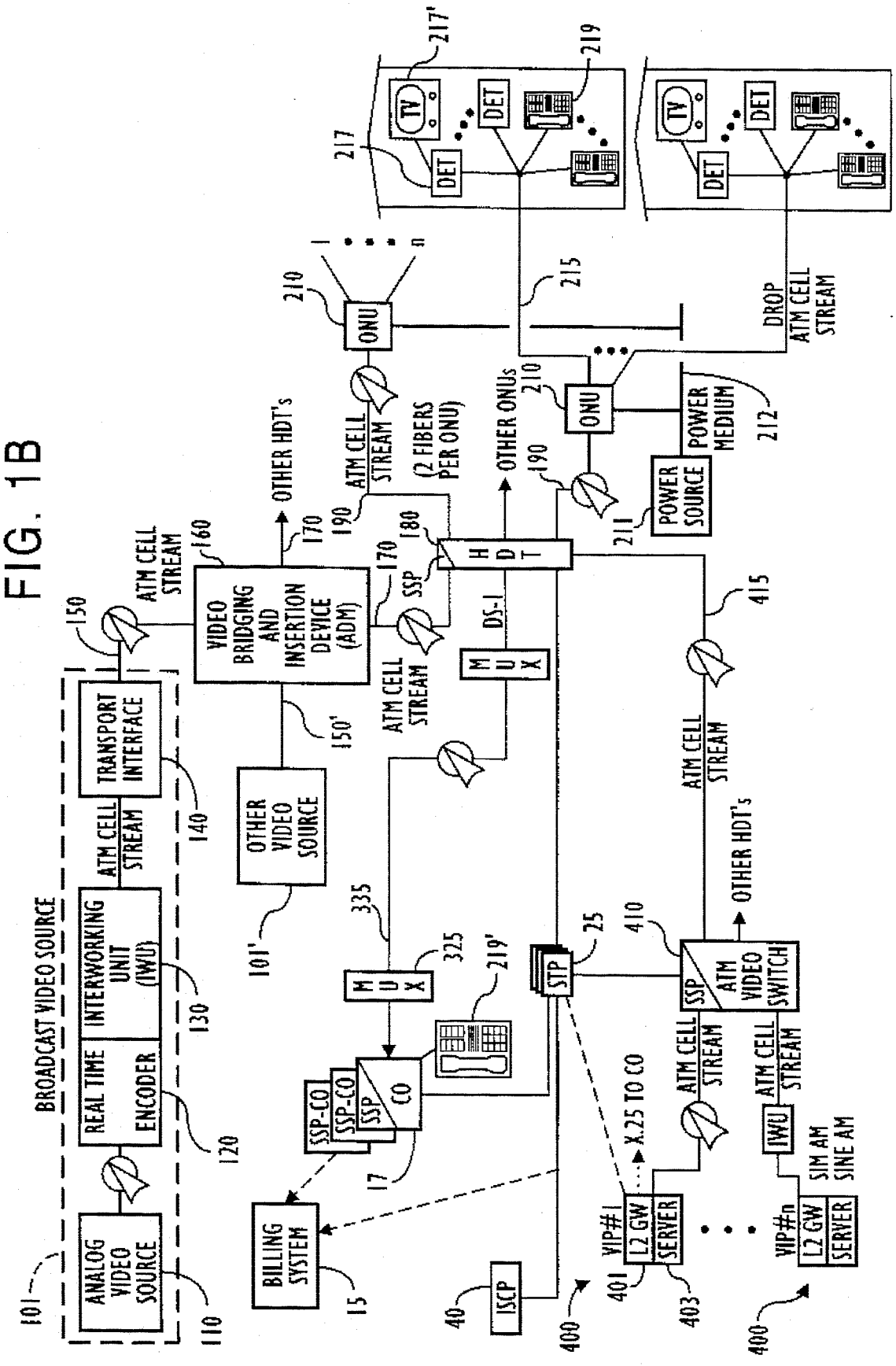
FIG. 1B is an alternate block diagram illustration of the exemplary integrated AIN type network, including several components of the system of FIG. 1A, with additional details regarding the broadband components.

FIG. 1A illustrates an integrated advanced intelligent dial tone network providing voice, data and broadband (e.g., video) communications connectivity. FIG. 1B is an alternate view of that network showing the data and broadband communications elements in more detail. In the typical situation, a local telephone operating company (TELCO) would deploy, operate and maintain such an integrated network. In addition to plain old telephone services and packet switched data services offered by the TELCO, a number of independent information providers offer CATV type broadcasts of broadband information services through the network. Other information providers offer interactive broadband services, such as video on demand.

A single centralized controller maintains a control data base and uses data from that data base to provide unified high level control over communications connectivity for the various types of communications services provided through the integrated network. Various switching points distributed throughout the network recognize triggering events and communicate with the central controller to determine how to process broadband, packet data and voice grade telephone calls. Essentially, the invention extends the AIN architecture and call processing techniques, developed for voice telephone service, to control packet data and broadband services. The control functions performed by the SSP and ISCP on broadband calls essentially eliminates or replaces the functionality of the level 1 gateway in the prior art network.

1. Network Architecture

The presently preferred embodiment utilizes the Integrated Services Control Point (ISCP) of the AIN telephone network as the centralized controller, although other controllers or network nodes could perform this function. Continuing the analogy to the AIN telephone network, the switch points communicating with and controlled by the ISCP are referred to herein as Service Switching Points. Service Switching Points, or 'SSP's', are appropriately equipped programmable switches present throughout the network, which recognize AIN type calls, launch queries to the ISCP and receive commands and data from the ISCP to further process the AIN calls.

In the network shown in FIG. 1A, each central office (CO) telephone switching system 11, 17 is labeled as an "SSP." In the illustrated embodiment, the SSP-CO's are end offices. All of the end office telephone switches 11, 17 are equipped and programmed to serve as SSP's. The illustrated embodiment is perhaps an ideal implementation which would make a variety of Advanced Intelligent Network (AIN) type telephone services widely available at the local office level throughout the network. Other AIN implementations for telephone services provide the SSP functionality only at selected points in the telephone portion of the network, and end offices without such functionality forward calls to an SSP switching office having tandem switching capabilities.

SSP capable telephone central office switching systems typically consist of a programmable digital switch with CCIS communications capabilities. One example of an SSP capable telephone CO switch is a 5ESS type switch manufactured by AT&T; but other vendors, such as Northern Telecom and Siemens, manufacture comparable digital switches which could serve as the SSP-CO's. Typically, these CO switches will also include packet data switch capabilities, so that one switching system can offer both voice and packet data communication services. The structure of an exemplary CO which may serve as the SSP type CO's in the system of FIG. 1A will be discussed in more detail below, with regard to FIG. 2.

The SSP-CO's connect to and provide telephone services to voice grade type telephone stations 219. Although shown as telephones in FIGS. 1A and 1B, the voice grade type terminals 219, 219' can comprise any communication device compatible with a voice grade type telephone line. As used herein, the term "telephone station" broadly encompasses telephones and any other device compatible with a voice grade telephone circuit, for example, station devices such as facsimile machines, modems, etc. In the illustrated preferred embodiment, the SSP-CO's also provide packet switched data services to end user data equipment, represented by exemplary terminal 218. Although all of the links to the telephone stations 219' and data devices 218 are illustrated as lines, those skilled in communications arts will recognize that a variety of local transport media and combinations thereof can be used between the end office switches and the actual telephone stations 219' and packet data stations 218, such as twisted wire pairs, subscriber loop carrier systems, radio frequency wireless (e.g. cellular) systems, etc.

With reference to FIG. 1A, the SSP type CO's 11 and 17 connect to a first local area STP 23. Other telephone SSP-CO's (not shown) may connect to additional local area STP's, such as the STP 25, as needed to meet projected telephone traffic demands. As discussed in more detail below, the STP's 23 and 25 also provide access to the signaling system 7 (SS#7) network for other SSP capable components of the integrated voice, data and broadband network. The connections to the STP's are for signalling purposes. As indicated by the circles below STP 23, each local area STP can connect to a large number of the SSP-CO's. The telephone central office SSP's are interconnected to each other by voice and/or packet data trunk circuits (illustrated in FIG. 1A as bold lines) for carrying voice grade telephone services and packet data services.

The local area STP's 23 and 25, and any number of other such local area STP's (not shown) communicate with a state or regional STP 31 which in turn provides communications with the ISCP 40. The STP hierarchy can be expanded or contracted to as many levels as needed to serve any size area covered by the Advanced Intelligent Network (AIN) and to service any number of stations and central office switches. Also, certain voice/data switching offices within the network, whether SSP's or not, may function primarily as tandem type offices providing connections between trunk circuits only.

The links between the telephone type central office switching systems (CO's) and the local area STP's 23 and 25 are typically SS#7 type CCIS interoffice packet switched data communication channels. The local area STP's are in turn connected to each other and to the regional STP 31 and the regional STP 31 also communicates with the ISCP 40, all via a packet switched network which preferably also is SS#7.

The above described data signalling network between the SSP type central offices and the ISCP is preferred, but other signalling networks could be used. For example, instead of the CCIS links, STP's and packet networks, a number of central office switches and an ISCP could be linked for data communication by a token ring network. Combinations of SS#7 and other data networks may be used. The exemplary ISCP 40 shown in FIG. 5 communicates via the STP(s) but also may connect to a parallel signaling data network for communication with certain network nodes. Also, the SSP capability may not always be available at the local telephone office level, and several other implementations might be used to provide the requisite SSP capability for telephone and packet data services, as will be discussed in more detail later.

There could be one or more ISCP's per state, to avoid overloading existing CCIS data links. Alternatively, the ISCP could be implemented on a LATA by LATA basis or on a regional operating company basis, i.e. one database for the entire geographic area serviced by one of the Regional Bell Operating Companies. In fact, if federal regulations permitted, the database service could become nationwide.

Figure 5:
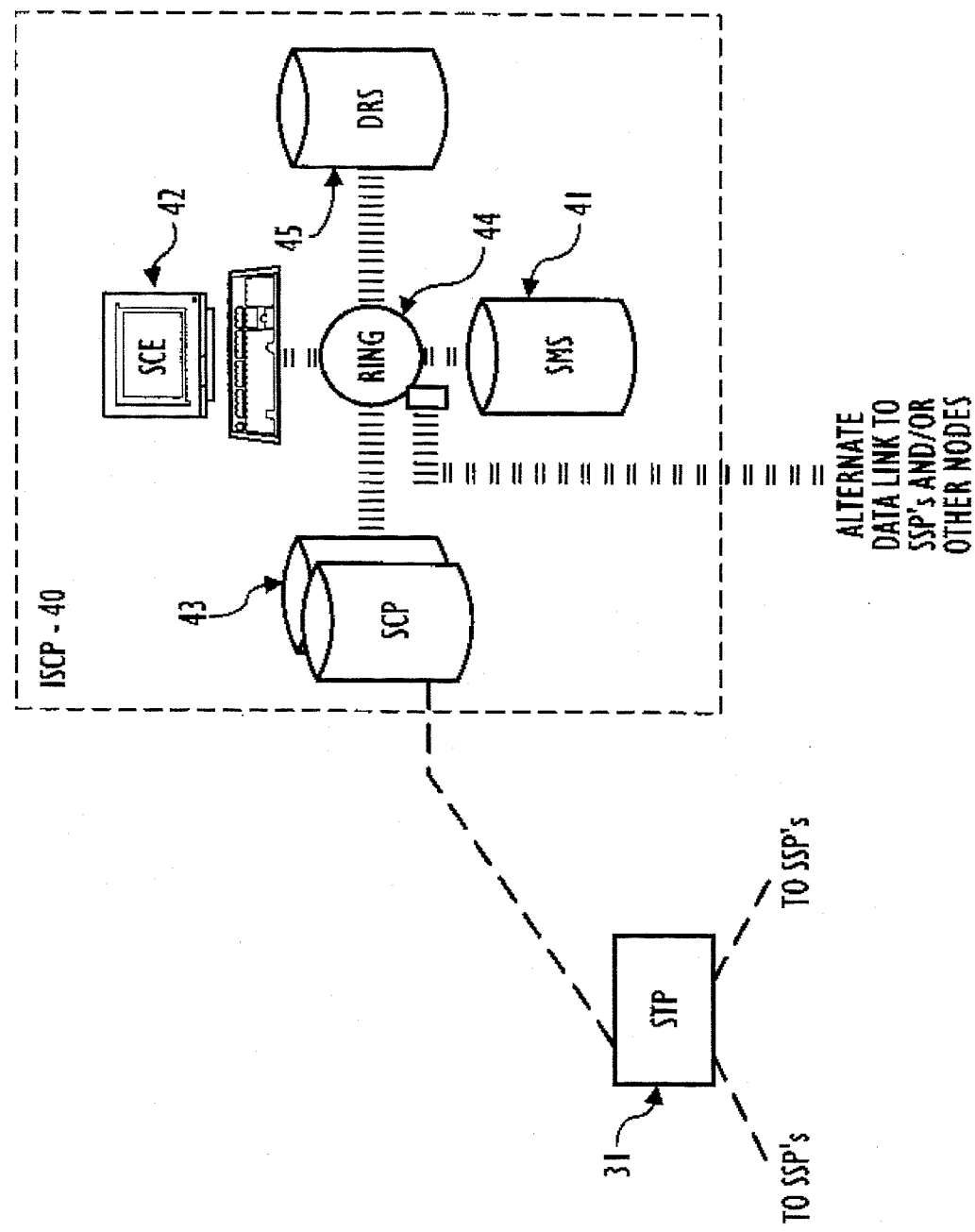
FIG. 5 is a more detailed diagram of an Integrated Service Control Point (ISCP) used as the central controller in the preferred intelligent network implementation of the present invention.

As shown in FIG. 5, the ISCP 40 includes a Service Management System (SMS) 41, a Data and Reporting System (DRS) 45 and the actual database referred to as the Service Control Point (SCP) 43. The ISCP also typically includes a terminal subsystem referred to as a Service Creation Environment or SCE 42 for programming the database in the SCP 43 for the services subscribed to by each individual customer. These components of the ISCP 40 communicate with each other via a token ring network 44. The STP 31 communicates directly with the SCP database 43. However, the token ring network may provide an alternate access to network nodes through a second signaling network operating in parallel to the SS#7 network.

The SCP database 43 stores data tables used to control telephone services provided through the network to callers using telephone stations. The SCP 43 also stores at least some data for controlling broadband services through the integrated network. These various data tables take reside in a Multi-Services Application Platform (MSAP) database maintained within SCP 43.

The network of FIG. 1A also provides integrated voice telephone service and broadband services to certain customers. As illustrated, at least one SSP-CO 17 connects to a local router, which in the illustrated embodiment is a host digital terminal (HDT) 180. The local router HDT provides two-way voice and packet data communications, with higher level switching for such communications being provided through one or more of the SSP-CO's. The local router HDT also receives broadband inputs from an ATM (asynchronous transfer mode) switch and from other sources (shown in FIG. 1B) as discussed later. The HDT 180 provides broadband, voice and data services through optical fibers and optical network units (ONU's) 210 to subscribers telephones and digital entertainment terminals (DET's) 217.

In accord with the present invention, all of the local routers (HDT's) 180 in the network are themselves equipped to function as SSP's, at least for broadband services, and preferably for voice and packet data services as well. The ATM switch 410 also is an SSP. As such, the SSP-HDT's 180 and the SSP type ATM switch 410 connect to the local area STP 25 for signaling communications with each other, with the SSP-CO's and with the ISCP 40. As shown in FIG. 1B, some of the broadband or video information providers (VIP's) equipment also may connect with the SS#7 network to communicate with the ISCP type central controller. In some cases, the VIP's equipment may itself have full SSP functionality.

In the illustration in FIG. 1A, many telephones 219', such as stations A, B and C, connect to end office SSP's 11 and 17, via standard existing telephone lines (or equivalents thereof). Subscribers to integrated communications services, however, communicate to an end office, such as SSP-CO 17, via transport media and routing components capable of transporting voice telephone signals as well as data and broadband information. To a user of a telephone station connected to integrated service lines, however, the telephone functionality appears to be the same as plain old telephone service, i.e. to the user of telephone station D, the calling operations and quality of services appear identical to those available to a person using telephone station A. Exemplary techniques for providing telephone service to a station such as telephone station D are discussed in more detail below with regard to FIG. 1B.

The AIN topology illustrated in FIG. 1A is exemplary in nature, and other network topologies can be used. For example, the illustrated networks include SSP functionality in each of the end office telephone switching systems. In some networks, at least some of the end offices may not have SSP capabilities. Each such end office would connect to a trunk which in turn feeds calls to a tandem switching system with SSP capabilities. The SSP tandem communicates with the ISCP, as in the implementation described above. For the SSP capable end office switches that may be present in the network, they communicate directly with the ISCP, in the same manner as in the embodiment of FIG. 1A. The SSP capable tandem office switch is a digital switch, such as the 5ESS switch from AT&T; and the non-SSP type end offices might be 1A analog type switches. Also, a switch point which is an SSP for one type of service, may not serve as an SSP for another type of service. For example, the HDT's 180 may be SSP's for data and broadband services, but not for telephone services. In such a case, the HDT's would route telephone calls through to one of the SSP telephone switches, either an end office or a tandem office.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node.

FIG. 1B shows the telephone portions of the network is less detail than FIG. 1A, but FIG. 1B illustrates the broadband distribution systems and associated control signaling network in greater detail. The integrated broadband network of the present invention will provide broadcast video distribution, archival video services and interactive multi-media services as well as a suite of narrowband services including plain old telephone service.

FIG. 1A includes a simplified illustration of a portion of the broadband distribution elements of the integrated network. Subscribers having broadband service would obtain all services through optical fiber connections to an HDT 180 and an ONU 210. A single drop may be used between the ONU 210 and the subscriber premises to carry voice, signaling and broadband information, and only a single connection is illustrated for simplicity. In the currently preferred embodiment, a coaxial cable carries the downstream broadband information and the two-way signaling information between the ONU 210 and the DET's 217 (only one shown) on the subscriber premises. A separate twisted wire pair carries telephone service signals (POTS or ISDN) between the ONU and the telephone station(s) D at the subscriber premises.

The HDT communicates with the SSP type CO 17 for providing connected subscribers with telephone services. In this regard, the HDT, the ONU and the optical fibers effectively function as an optical type subscriber loop carrier system. The SSP-HDT may itself act as an end office or PBX type switch. Alternatively, the SSP-CO may route all telephone calls to the associated CO for further processing. The SSP processes outgoing telephone calls from telephone type equipment, such as station D, as well as incoming calls directed to that equipment in essentially the same manner as for calls to and from lines having only POTS type service, e.g. to standard telephone stations A and B.

To provide broadband video services, the HDT 180 receives ATM broadband signals from servers operated by interactive services providers through an ATM switch 410 and from other sources such as broadcast ATM sources or servers shown in more detail in FIG. 1B. In the present invention, the HDT has full SSP capabilities, essentially in the same manner as the SSP type CO's 11 and 17, discussed above. The HDT therefore also conducts signaling communications with the ISCP 40 and with other components discussed in more detail below, to provide subscriber requested broadband services through the DET 217 and the associated television set 217'.

Figure 6:
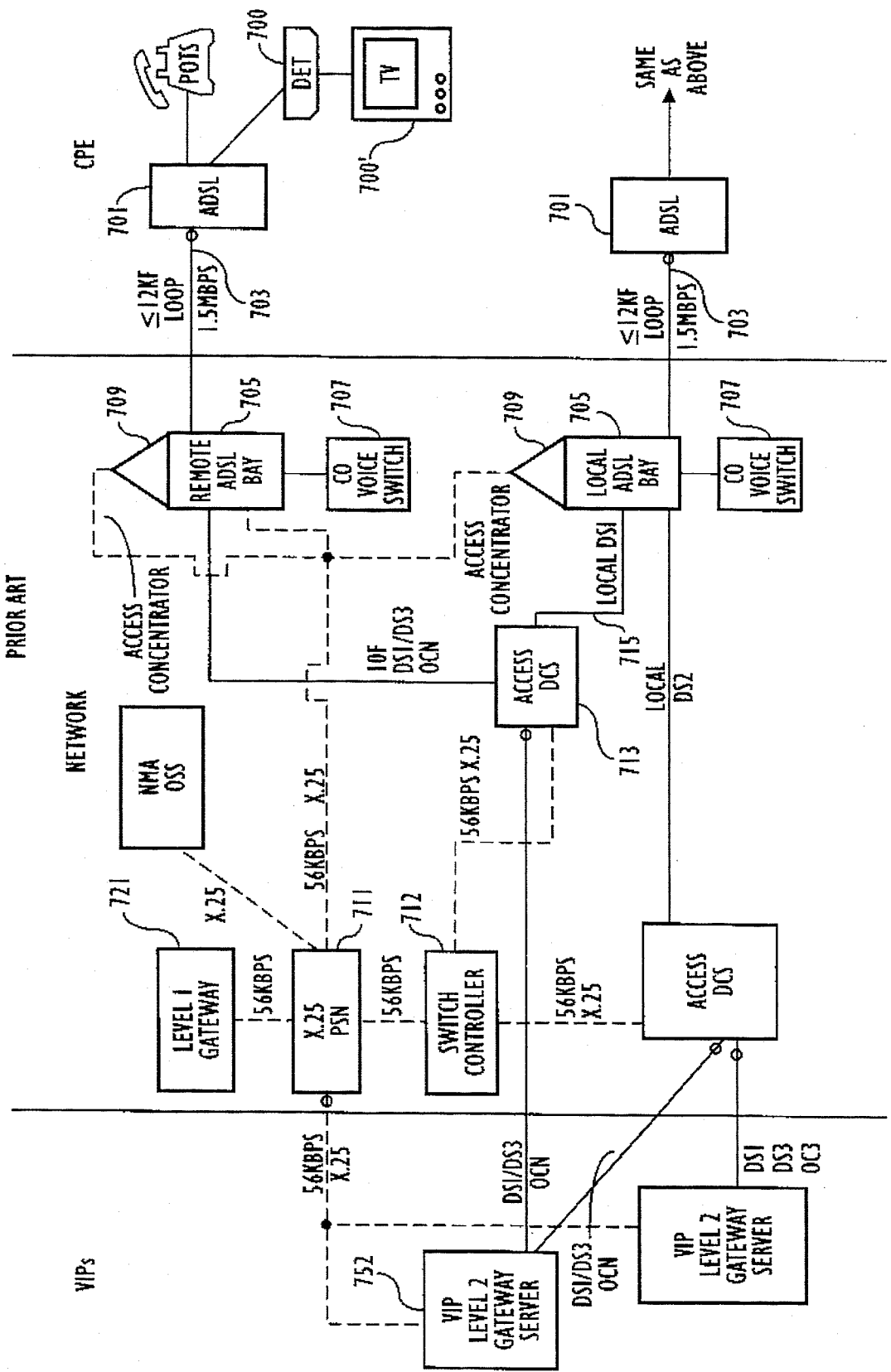
FIG. 6 illustrates an exemplary prior art configuration of a video dial tone network.

The invention could be practiced in a network using ADSL technology and/or digital cross connect switching similar to those features in the prior art network of FIG. 6 or in a hybrid fiber coax network using radio frequency transport of digitized, compressed video signals as in the Ser. No. 08/304,174 case noted earlier. The illustrated embodiment, however, utilizes an advanced fiber to the curb system with ATM (Asynchronous Transport Mode) transport, similar to one of networks disclosed in commonly assigned application Ser. No. 08/250,792, filed May 27, 1994, entitled "Full Service Network", the disclosure of which is incorporated herein entirely by reference. The invention could easily be adapted to control a variety of other types of video dial tone networks.

As illustrated in FIG. 1B, the broadcast video services will initiate from a broadcast video source or server 101. The broadcast server 101 includes an actual analog video source 110. Although only one is shown, a typical broadcast service provider will have a plurality of such sources. The analog signal from the source is carried by any convenient means, such as an optical fiber, etc. Means (not shown) are provided as necessary to convert analog video transmission signals, e.g. NTSC broadcast signals, to baseband video and audio signals. The baseband signals are applied to a real time encoder 110.

The real time encoder 110 digitizes the audio and video signals and performs data compression. As currently envisaged, the encoder will encode the program signal into an MPEG 2 format although other digital compression encoding schemes may be used, such as DIGICIPHER™. MPEG (moving picture experts group) is a broad generic standard for video program compression, and MPEG 2 is a second generation compression standard for packetized transport of one or more compressed video program signals in a single stream. A number of specific compression algorithms will satisfy MPEG requirements. Typically, MPEG permits encoding of audio/video program materials into digitized, compressed format at rates in the range of 1.5 to 6 Mbits/sec.

The illustrated real time encoder 120 preferably is set up as a bank of encoders to process six sets of analog audio/video program signals in parallel. As such, the bank of encoders 110 produces six 6 Mbits/sec MPEG 2 bit streams, which are combined together with appropriate overhead information into a single 45 Mbits/sec DS-3 type signal. The DS-3 signal from the encoder 110 is input to an interworking unit (IWU) 130. The interworking unit 130 is the actual input point for the encoded broadcast video information into the network.

The exemplary network illustrated in FIG. 1B utilizes asynchronous transfer mode (ATM) switching to transport all video information, including the broadcast video information. ATM is a packet oriented time division multiplexing technique. In ATM, information is organized into cells having a fixed length and format. Each cell includes a header, primarily for identifying cells relating to the same virtual connection, and an information field or "payload". In one proposal, a 53 octet ATM cell would include a cell header consisting of 5 octets and a payload consisting of 48 octets of data. The ATM cell header information includes a virtual circuit identifier/virtual path identifier (VCI/VPI) to identify the particular communication each cell relates to. For example, for broadcast signals, the VCI/VPI will identify a particular program channel. For a point to point transmission, e.g. for video on demand, the VCI/VPI in each header of the ATM cells would effectively identify a specific end point of the virtual communication link.

ATM transfer is asynchronous in the sense that the recurrence of cells that contain information from any particular sender is not necessarily periodic. Each device using the ATM network submits a cell for transfer when they have a cell to send, not when they have an assigned or available transmission time slot. ATM allows any arbitrary information transfer rate up to the maximum supported by the ATM network, simply by transmitting cells more often as more bandwidth is needed. In an initial implementation, all video materials will be transferred at a constant, standardized bit rate, however, preferred later generations of the network will utilize the ATM capabilities of the network to permit transmission of video information over channels of different bit rates, e.g. 1.5 Mbits/sec, 3 Mbits/sec, 6 Mbits/sec, etc. It will also be possible to vary the bit rate during communication on an as needed basis.

The interworking unit (IWU) 130 grooms the continuous MPEG 2 bit streams of the broadcast services for ATM cell stream transmission over optical fiber transport links. For example, the interworking unit maps MPEG transport stream packets into ATM cells. Specifically, the interworking unit will divide the MPEG packets into appropriate length payloads and combine the payload data with appropriate cell headers, necessary for ATM transport. In an initial implementation, downstream links would carry an OC-12 bit rate, but higher rate transports such as OC-48 will be used in later implementations. Assuming use of OC-12, one such transport link will normally carry the equivalent of 12 DS-3's. However, conversion into ATM cell format with associated headers imposes added overhead requirements on the data transmissions. In the presently preferred embodiment, one interworking unit 130 therefore processes up to ten DS-3 signals to produce an ATM bit stream at the OC-12 rate.

A transport interface 140 converts the electrical signal from the interworking unit 130 into an optical signal and transmits the optical signal through fiber 150 to an adaptive digital multiplexer (ADM) identified in the drawing as a video bridging and insertion device 160. The ADM 160 performs three functions, passive bridging, active bridging and insertion of signals from other broadcast service providers (if any). The three functions may actually be separate, but in the preferred embodiment would be performed by elements collocated within the one network component ADM 160.

As noted above, the real time encoders 120 each output a single DS-3 signal comprising up to 6 MPEG 2 bit streams. The interworking unit 130 processes up to ten DS-3 signals to produce an ATM bit stream at the OC-12 rate. Consequently, one broadcast video source 101 may produce as many as 60 channels of CATV type broadcast programming for transport over one OC-12 type SONET optical fiber 150. Many providers, however, may not choose to broadcast so many channels. For example, the provider operating broadcast video source 100 may offer only 42 channels. Such an ATM channel transmission on the optical fiber 150 will not utilize the entire OC-12 channel capacity of that fiber. In the specific example, the 42 channels together require the equivalent of 7 of the available 10 DS-3's.

The illustrated architecture permits a second broadcast service provider to utilize the transport capacity not used by the first provider. The second broadcast service provider would offer additional channels from a separate second source 101'. The broadcast source type server 101' is essentially identical in structure and operation to the source server 101, but the source/server 101' will offer up to the number of channels necessary to fill the OC-12 transport capacity. In the example, if the source 101 transmits 42 channels (7 DS-3's) via the fiber 150, the second source 101' could transmit up to 18 additional channels (3 DS3-'s). The function of the insertion device in the ADM 160 is to combine the signals from the two sources into a single OC-12 rate signal (10 DS3's in ATM cell format) for further transmission through the optical network.

The two bridging functions facilitate dissemination of the broadcast material throughout the entire network. The passive bridging elements are optical splitters for splitting one OC-12 optical signal from the insertion device into a number of duplicates thereof, e.g. 1:2, 1:4, 1:8, etc. The active bridging elements convert an optical signal to an electrical signal, regenerate the electrical signal and convert the regenerated signal back to an optical signal for application to multiple output ports. The optical OC-12 output signals from the bridging components are transmitted over a large number of optical fibers 170 to host digital terminal type local routers throughout the network service area. One host data terminal (HDT) 180 is shown in FIG. 1B as a representative example.

When a subscriber requests a specific broadcast channel, the digital entertainment terminal (DET) in the subscriber's home provides a signal identifying the selected channel to the HDT 180. The signaling between the digital entertainment terminal (DET) and the HDT 180 and the real time control of the routing by the HDT 180 will be discussed in more detail below. For simplicity here, assume for the moment that the subscriber should receive the requested channel. Inside the HDT, the ATM cell stream from an optical fiber 170 is applied to an ATM switching system of some type. To carry larger numbers of channels, there would be duplicate sources, insertion devices and bridging elements to transport the additional channels over fibers parallel to the illustrated fibers 170. Signals from one or more such additional parallel fibers would be applied to corresponding parallel inputs to the internal ATM switch. The control functionality of the HDT 180 and the interaction of the SSP-HDT 180 with the ISCP 40 to achieve that control will be discussed in detail later.

One HDT will communicate with a large number of optical network unit (ONU's) via pairs of optical fibers 190. As currently envisaged, each home or living unit will have as many as four DET's. Each ONU 210 and the downstream fiber of the pair 190 to the ONU 210 will provide downstream video services to a number of homes, e.g. 8 to 24. The transmissions on the downstream fibers between the HDT and the ONU's 210 are synchronous, although the video information remains in ATM cell format. Each DET served by an ONU 210 is assigned a specified time slot on the downstream fiber of a pair 190.

The HDT 180 includes a component which is essentially a non-blocking type ATM switch (discussed in more detail below with regard to FIG. 4). In response to the selection signal from a DET, the HDT 180 accesses the appropriate input circuit interface unit and identifies each ATM cell from that fiber interface for which the header information indicates that the cell represents information for the selected broadcast channel. The identified ATM cells are bridged by the internal ATM switch to a line interface unit providing transmissions over the optical fiber 190 to the particular ONU 210 which services the requesting subscriber's premises. When the HDT selects each ATM cell for transmission to a specific DET, elements on the line interface card communicating with the particular ONU will buffer the cell as necessary and place the cell in the time slot for that DET on the downstream fiber of optical fiber pair 190. The cells selected for a particular DET, together with cells going to other DET's served by the same ONU multiplexed into their respective time slots, are applied to an electrical to optical converter and transmitted over the downstream fiber to the ONU 210 serving the particular subscriber's premises.

The basic purpose of the ONU 210 is to desegregate the HDT side links into individual customer links and provide optical to electrical conversion for electrical delivery to the individual subscribers' premises. Although depicted as a single line in FIG. 1B, in the current implementation, the drop cable to each subscriber's premises comprises a coaxial cable for carrying the video and/or digital data signals and a twisted wire pair for carrying telephone signaling. Alternatively, ADSL communications over twisted wire pair could be used between the ONU and the subscribers premises. In the preferred embodiment, the ONU 210 includes means to convert optical signals received over the downstream fiber of the pair 190 to electrical signals and transmit signals from each DET's assigned time slot down over the coaxial cable to the subscriber's premises. The ONU 210 provides two-way conversion between optical and electrical and between digital and analog signals for voice telephone service over the twisted wire pairs. The ONU's also provide two-way conversion between optical and electrical and multiplexing and demultiplexing for the signaling channels to/from the DETs 217.

More specifically, the DET 217 responds to user inputs on the built in keypad or the remote control by transmitting appropriate data signals over a narrowband channel on the coaxial drop cable to the ONU 210. Each ONU 210 multiplexes the user input data signals from the DET's 217 that it services together and transmits those signals to the SSP-HDT 180 over an upstream fiber of the optical fiber pair 190. If related to processing of a broadband call, e.g. selection of a channel or an interactive broadband service VIP, the SSP-HDT 180 processes those signals and may interact with the ISCP 40, as discussed in more detail below, to determine how to route the broadband service call. In the preferred embodiment, the SSP-HDT 180 will respond similarly to signals from a DET 217 relating to packet data calls and preferably processes voice calls in a similar manner.

Once an interactive call is routed through to its broadband or packet data call destination, the HDT 180 transmits the upstream control signals to control elements at the respective destination. For example, for an interactive broadband service such as video on demand, the VIP would operate a control element identified as a level 2 gateway, of essentially the same type os the level 2 gateway in the prior art system of FIG. 6. In an initial implementation, the HDT's 180 communicate with the level 2 gateways through an X.25 type data call through the packet switched data communication portion of the integrated network. This packet data call operates in parallel to the broadband link between the VIP's broadband file server 403 and the DET 217. For VIP's connected to the ATM switch 410, future implementations will use ATM communications through that switch for the two-way signaling communication between the level 2 gateway and the DET 217. For an established packet data call, e.g. to the packet data device 218 (FIG. 1A) the HDT 180 simply forwards upstream data to the next higher packet data node in the network, typically. the CO 17, for further transport to the other party to the call. Similarly, the HDT would route downstream packet data received from the higher level packet node through the signaling channel to the calling subscriber's DET.

The network of FIG. 1B also includes a billing system 15 operated by the TELCO. The billing system communicates with all of the SSP's, either through the CCIS network and STP's or through a separate parallel data communication link. Whenever a complete communication link is set up, between telephone stations, between a DET 217 and a packet data device 218, between an interactive broadband service VIP 400 and a DET 217 or to supply a broadcast service to a DET 217, one or more of the SSP's formulates an appropriate message for the billing system 15. The message identifies the subscriber, the type of communication (e.g. to a broadband VIP or selection of the particular channel) the other party to the communication (e.g. the called party or the broadcast VIP) and the start time. The same SSP formulates a similar message to the billing system 15 when the broadband transmissions end and the communication link is torn down. These messages may be transmitted to the billing system on a real-time basis, as events occur, or the SSP's may store the various billing data and periodically upload the messages to the billing system 15.

A power source 211 supplies −130 V dc and battery reserve power, for at least telephone service, to the ONU's 210. The power source 211 may connect to the ONU's via twisted pairs, but in the preferred embodiment, the power is carried over a coax distribution cable.

At the subscriber premises, a network interface module (NIM) couples the set-top device or digital entertainment terminal (DET) 217 to the coaxial drop cable of the distribution network. In this network configuration, the NIM includes appropriate means to select ATM cells from its assigned time slot on the coaxial cable and strip off the ATM header information and reconstitute the digital payload data, e.g. into MPEG packetized information. The NIM also provides two way signaling for transmission of narrowband data through the network, typically for control signaling purposes.

In the illustrated network, the DET 217 also includes a CPU comprising a 386 or 486 microprocessor with associated memory (RAM, ROM and EPROM), as well as an audio/video decoder controlled by the CPU. The audio/video decoder decompresses the digitized broadband information. The preferred embodiment of the audio/video decoder comprises an MPEG video decoder, an MPEG audio decoder, and an MPEG demultiplexer for selectively routing MPEG encoded video and audio packets carried on the digital broadband channel to the MPEG video decoder and the MPEG audio decoder, respectively. The MPEG demultiplexer routes data packets from the MPEG stream to the CPU for further processing, e.g. as downloaded data and/or control programming or as graphic/text information. The DET 217 also includes a graphics display generator for generating displays of received graphics and text data output by the CPU, such as the initial turn-on selection menu, discussed in more detail below. The DET 217 also includes digital to analog converters and appropriate drivers to produce output signals compatible with a conventional television set 217' from the decoded audio/video information and the graphics display. Each DET also includes means to receive selection signals from a user and transmit appropriate data signals over a narrowband signaling channel through the network.

Although simpler set top terminals may be used, the presently preferred digital entertainment terminal (DET) 217 is a programmable device to which different applications programs will be downloaded from an information provider's level 2 gateway device, in order to permit the DET to interact with different information service providers and thereby offer the user totally different types of services. At least one VIP, typically a vendor of the DET 217, also can download portions of the operating system. The DET 217 will permanently store only an operating system and a loader program, to control initial communications with the SSP-HDT 180. Based on this loader routine, the DET 217 will normally wake up in a CATV-like mode of operation for selecting and receiving broadcast programs. For example, the DET 217 will normally store an identification of the last broadcast channel viewed, in non-volatile memory, and will retain that identification in memory while the DET is off. When the user turns the DET 217 back on, the DET will transmit a request for the last viewed channel to the SSP-HDT 180, to obtain that channel for display in the usual manner. The DET 217 will also offer the video information user (VIU) the option to select initiation of a call to an interactive service provider through the ATM switch and or through the packet data switching function of the CO's.

The structure and operation of the DET 217, outlined above, are described in more detail in commonly assigned application Ser. No. 08/250,791, filed May 27, 1994, entitled "Dynamically Programmable Digital Entertainment Terminal", the disclosure of which is entirely incorporated herein by reference.

2. SSP's

Figure 2:
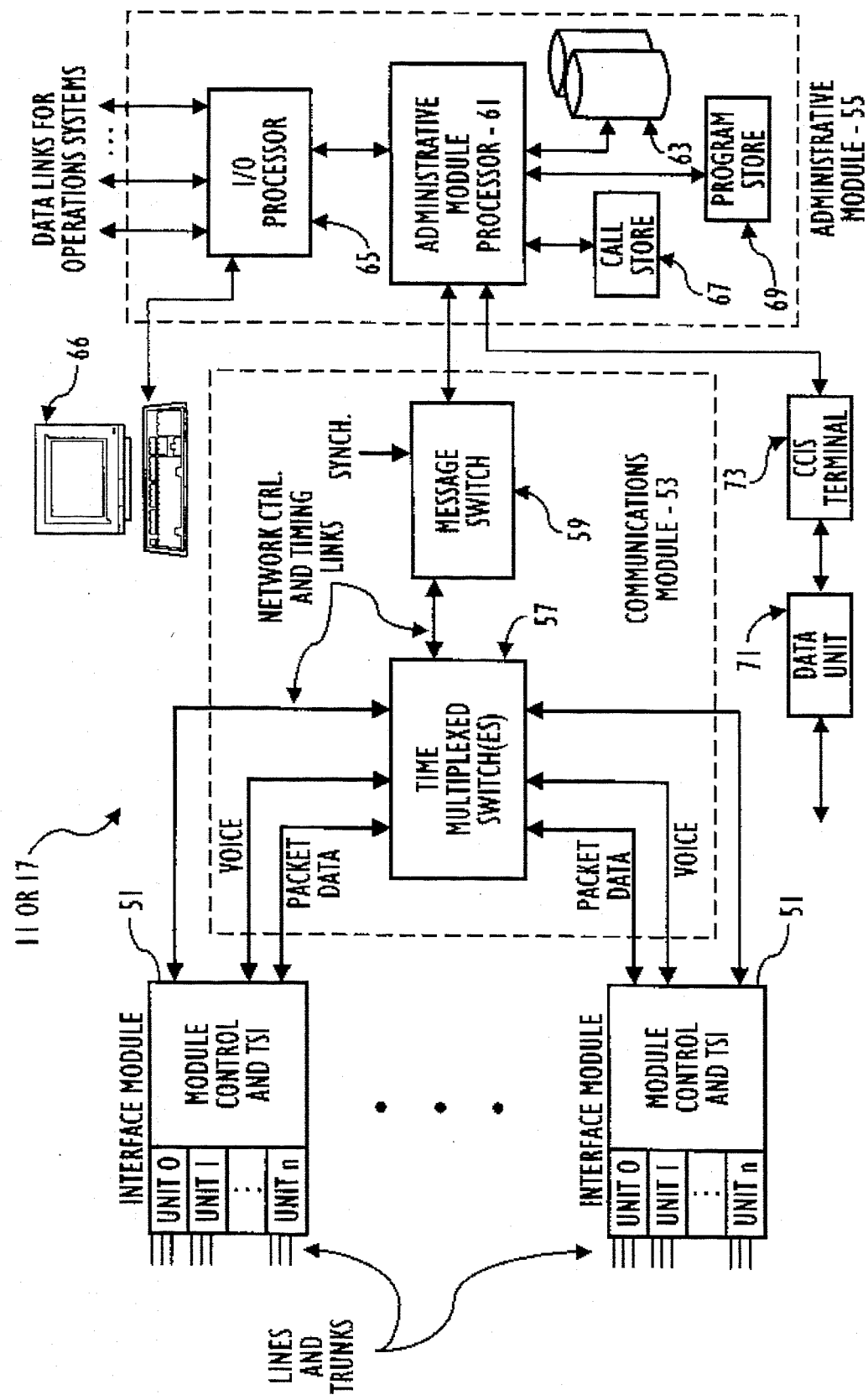
FIG. 2 is a more detailed diagram of an SSP type central office (CO) used in the preferred intelligent network implementation of the present invention to provide switched or selective communications links for voice and/or packet data services and associated signaling.

FIG. 2 is a simplified block diagram of an electronic program controlled switch which may be used as any one of the SSP type CO's in the system of FIG. 1A and 1B. As illustrated, the CO switch 11 or 17 includes a number of different types of modules. In particular, the illustrated switch includes interface modules 51 (only two of which are shown), a communications module 53 and an administrative module 55. The SSP-CO provides switched voice grade telephone services and packet switched data services (X.25 and/or ISDN).

The interface modules 51 each include a number of interface units 0 to n. The interface units terminate lines from subscribers' stations, trunks, T1 carrier facilities, etc. Where the interfaced circuit is analog, for example a standard subscriber telephone loop to station 219' (FIG. 1A), the interface unit will provide analog to digital conversion and digital to analog conversion. Alternatively, the lines or trunks may use digital protocols such as T1 or ISDN, e.g. to provide transport to various combinations of voice and packet data equipment. The trunk circuit to one of the HDT's 180 will take the form of a pair of optical fibers providing two-way transport for a number of multiplexed DS-1 type signals. Each DS-1 comprises 24 slots, each slot providing transport for a 64 kbits/s DS-0 slot. Each DS-0 slot (equivalent to an ISDN B-channel) can transport digitized voice or packets of data, e.g. in X.25 format. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information or packet data information are transferred in two directions between interface units via the time slot interchange (intramodule call connections) or transmitted in two directions through the network control and timing links to the time multiplexed switch 57 and thence to another interface module (intermodule call connection).

The time multiplexed switch 57 may consist of a single switch fabric capable of time division multiplexed routing of packets representing both voice and data. Alternatively, the switch 57 may comprise separate switch modules for time division multiplexed routing of the voice words and the data packets.

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between the administrative module processor 61 and an SS#7 network connection to an STP or the like (see e.g. FIG. 1A), for facilitating call processing signal communications with other CO's, with HDT's 180 and with the ISCP 40. The CCIS terminal 73 and data unit or an additional terminal and data unit (not shown) provide communications between the administrative module of the CO and an appropriate billing system 15 (see FIG. 1B).

As illustrated in FIG. 2, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. For a call by or to a subscriber of an AIN based telephone service, the call store 69 would receive and store information defining various trigger events to look for during processing of the call. The program store 69 stores program instructions which direct operations of the computer serving as the administrative module processor.

Figure 3:
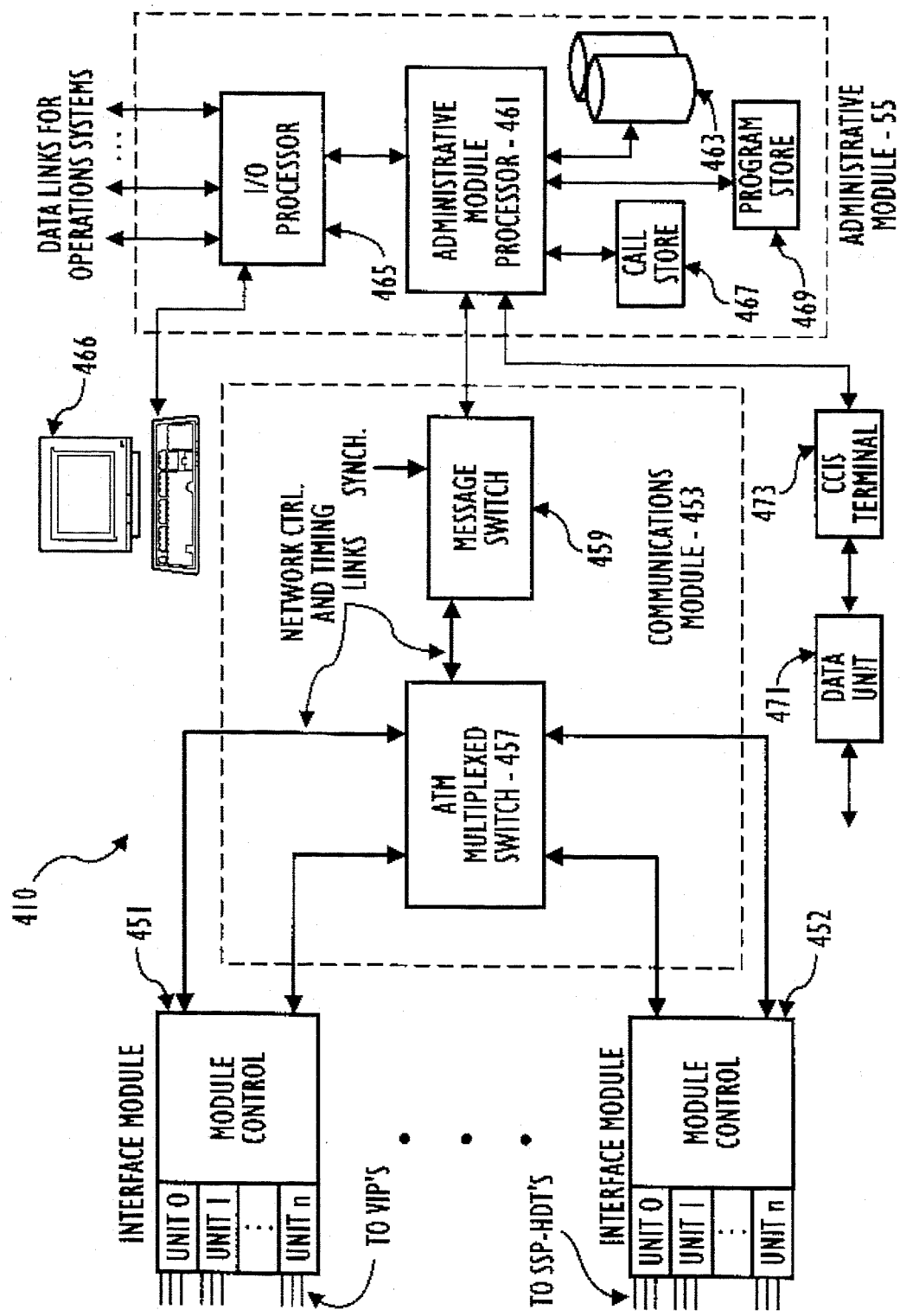
FIG. 3 is a more detailed diagram of an SSP type Asynchronous Transfer Mode (ATM) switching system used in the preferred intelligent network implementation of the present invention to provide switched or selective communications links for broadband (video) and/or packet data services.

FIG. 3 is a simplified block diagram of an ATM type electronic program controlled switch which may be used as the switch 410 in the system of FIGS. 1A and 1B. The organization of the SSP type ATM switch of FIG. 3 is substantially similar to that of the SSP-CO shown in FIG. 2, although a variety of other switch architectures may be used. As illustrated in FIG. 3, the ATM switch includes interface modules 451, 452 (only two of which are shown), a communications module 453 and an administrative module 455.

The interface module 451 terminates lines from VIP's equipment. The interface module 451 includes a number of interface units 0 to n. As discussed in more detail below, these line interface units receive ATM cell streams representing broadband information from the VIP's equipment and may provide a two-way connection to the VIP's equipment for signaling information and/or data communications in ATM cell format.

The interface module 452 terminates optical fiber trunks going to the SSP-HDT's 180. The interface module 452 includes a number of trunk interface units 0 to n. These trunk interface units transmit ATM cell streams representing broadband information to the SSP-HDT's 180 and may provide a two-way connection to the to SSP-HDT's for signaling information and/or data communications in ATM cell format.

ATM cells are transferred in two directions through the network control and timing links to the ATM multiplexed switch 457 and thence to another interface module in a manner similar to an intermodule call connection in the CO-SSP of FIG. 2. More specifically, in the ATM switch of FIG. 3, ATM cells from a VIP (broadband, data and signaling) are transferred from the appropriate line interface unit in module 451 through the ATM multiplexed switch 457 to a trunk interface unit in module 452 servicing the appropriate SSP-HDT. Similarly, ATM cells from an SSP-HDT (data and signaling) are transferred from the appropriate trunk interface unit in module 452 through the ATM multiplexed switch 457 to a line interface unit in module 451 servicing the particular VIP. Although labeled and described as a "switch," the module 457 may in fact utilize a variety of fabrics to achieve the necessary routing of cells between interface modules and the attendant cell policing.

The communication module 453 includes the ATM multiplexed switch 457 and a message switch 459. The ATM multiplexed switch 457 provides the actual ATM transfer of cells between channels of the interface modules 451, 452 and transfers control data messages between the interface modules. The message switch 459 interfaces the administrative module 455 to the ATM multiplexed switch 457, so as to provide a route through the ATM multiplexed switch permitting two-way transfer of control related messages between the interface modules 451, 452 and the administrative module 455. In addition, the message switch 459 terminates special data links, for example a link for receiving a synchronization carrier used to maintain digital synchronism.

The administrative module 455 includes an administrative module processor 461, which is a computer equipped with disc storage 463, for overall control of operations of the SSP type ATM switching system. The administrative module processor 461 communicates with the interface modules 451 through the communication module 455. The administrative module 455 also includes one or more input/output (I/O) processors 465 providing interfaces to terminal devices for technicians such as shown at 466 in the drawing and data links to operations systems for traffic, billing, maintenance data, etc. A CCIS terminal 473 and an associated data unit 471 provide a signalling link between the administrative module processor 461 and an SS#7 network connection to an STP or the like (see FIG. 1A), for facilitating call processing signal communications with the CO's, the HDT's and the ISCP 40. The CCIS terminal 473 and data unit 471 or an additional terminal and data unit (not shown) provide communications between the administrative module 455 and the billing system 15 (FIG. 1B).

As illustrated in FIG. 3, the administrative module 455 also includes a call store 467 and a program store 469. Although shown as separate elements for convenience, these are typically implemented as memory elements within the computer serving as the administrative module processor 461. The disc memory 463 stores data tables defining all possible virtual circuits through the ATM switch and the HDT's to each terminal of a customer subscribing to a particular provider's services. These data tables define the header information (e.g. VCI/VPI) and the particular fiber output port used to route cells to the correct HDT 180. These data tables thus define "permanent virtual circuits" (PVC's) between the providers 400 and the DET's 217. In implementations where the ATM switch 410 also provides two-way transport of signaling data between the VIP's level 2 gateways 401 and the HDT's 180, the disc memory 463 would store similar PVC data tables for the signaling links. The program store 469 stores program instructions which direct operations of the computer serving as the administrative module processor. For each call in progress, the call store 467 stores translation information retrieved from disc storage 463 together with routing information and any temporary information needed for processing the call. Consider for example an interactive session between a subscriber and a VIP using ATM signaling, as in the preferred future implementation. In such a case, the call store 467 would receive and store the VCI/VPI designations necessary for routing the downstream broadband information, and the two-way signaling information, from the VIP's equipment through currently available ATM virtual circuits and the HDT and ONU to the subscriber's terminal (DET) from the PVC table in the disc storage system 463.

Figure 4:
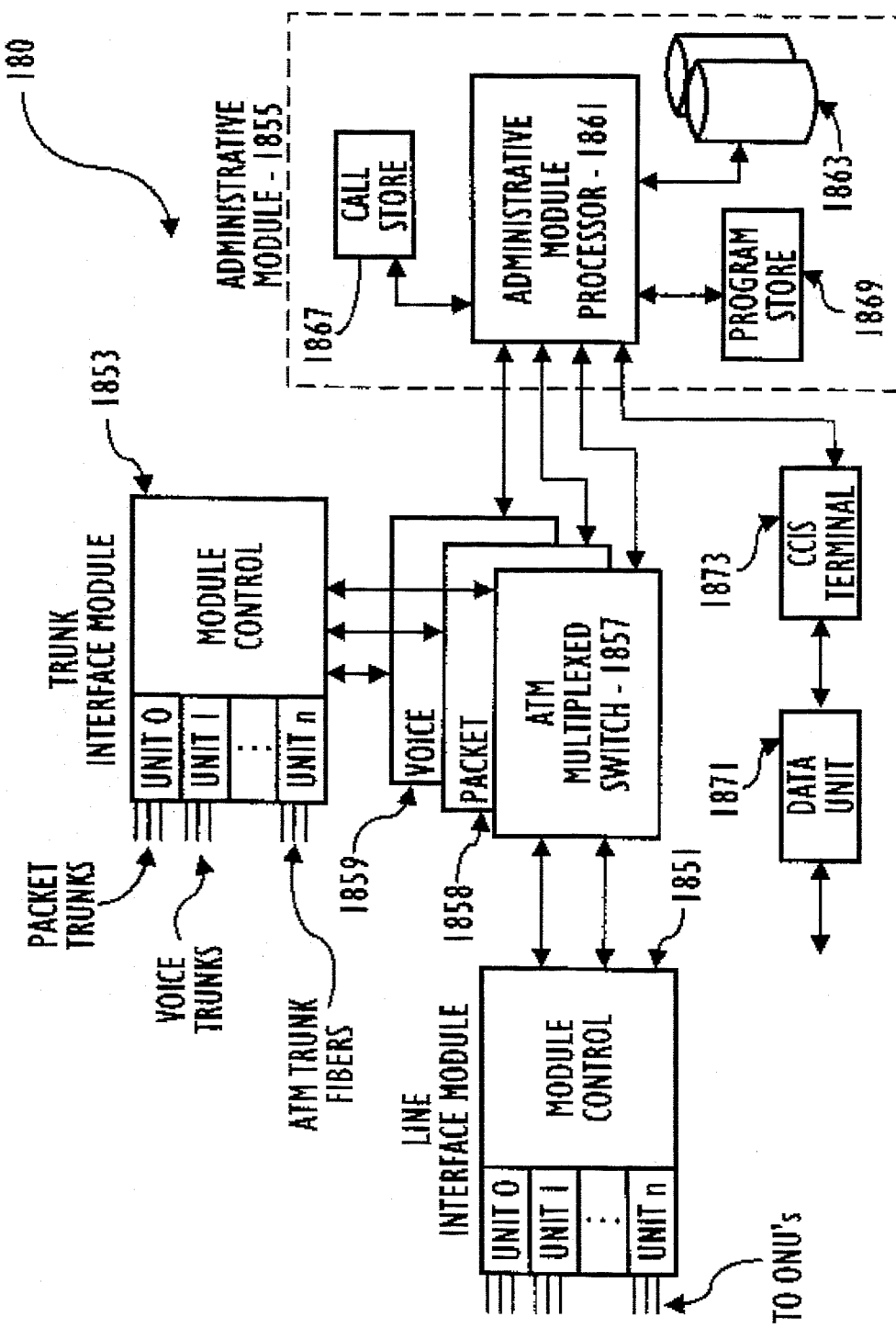
FIG. 4 is a more detailed diagram of an SSP type local router, in this case a Host Digital Terminal (HDT), used in the preferred intelligent network implementation of the present invention.

FIG. 4 is a simplified block diagram of an electronic program controlled switch which may be used as any one of the SSP-HDT's 180 in the system of FIG. 1A. As illustrated, the SSP-HDT includes one or more line interface modules 1851, one or more trunk interface modules 1853, a series of actual switch modules, and an administrative module 1855.

The line interface module 1851 includes a number of interface units 0 to n. These interface units terminate optical fibers providing two-way communications through the ONU's to and from the actual subscribers' stations. Part of the function of the interface units is to provide two-way conversion between electrical signals and optical signals. The line interface units also place the broadband ATM cells, the voice telephone information, packet data information and/or signaling data in appropriate channels going to the ONU. In the opposite communication direction, the line interface units supply upstream voice telephone information, and packet and/or signaling data from the subscriber's channels on the fibers from the ONU's to appropriate switches 1858, 1859 within the HDT.

The trunk interface module 1853 includes a number of trunk interface units 0 to n. These interface units terminate a variety of packet data, voice and ATM trunk circuits. More specifically, certain of the interface units terminate optical fiber trunks carrying broadcast video service information, in ATM cell stream form, to the HDT 180. Other interface units terminate ATM cell stream fiber trunks which carry broadband information from the ATM switch 410. In the future, these interface units will also provide a termination for two-way ATM cell streams providing signaling and data communication through the ATM switch 410. The voice trunk interface units terminate standard voice trunks coupled to one of the telephone type CO's, for example SSP-CO 17 shown in FIG. 1A.

The packet data trunk interface units terminate packet data trunk circuits coupled to a packet data switch, however, in the preferred implementation, the packet data switching is performed within one of the telephone type CO's, again for example the SSP-CO 17 shown in FIG. 1A. Although shown as separate trunk circuits in FIG. 4, the packet data and digitized voice may actually ride in different channels multiplexed onto a common trunk medium between the HDT and the CO as discussed above relative to FIG. 1B. Specifically, the trunk circuit between the HDT 180 and the CO preferably will take the form of a pair of optical fibers providing two-way transport for a number of multiplexed DS-1 type signals. Each DS-1 comprises 24 slots, each slot providing transport for a 64 kbits/s DS-0 slot. Each DS-0 slot (equivalent to an ISDN B-channel) can transport digitized voice or packets of data, e.g. in X.25 format.

Where the actual media of the trunks is optical, the interface units provide conversions between optical and electrical. The trunk interface units also receive the broadband ATM cells, downstream voice telephone information, and packet data information and/or signaling data in appropriate channels from the respective trunks and supply that information going to the appropriate one of the switches 1857, 1858, 1859 within the HDT. In the opposite communication direction, the trunk interface units supply upstream voice telephone information, and packet data from the subscribers to the appropriate trunks going to the associated CO. For upstream signaling intended for one of the VIP's, the ATM switch 1857 supplies that data in ATM cell stream format through the module control to the appropriate ATM trunk interface providing upstream transmission through an optical fiber to the ATM switch 410.

Each interface module 1851, 1852 includes, in addition to the noted interface units, a duplex microprocessor based module controller. Digital words representative of voice information, packets of data and ATM cells transmitted in two directions through network control and timing links to the time multiplexed voice switch 1859, the packet data switch 1858 and the ATM multiplexed switch 1857 and thence to the other type of interface module in a manner similar to an intermodule call connection in the telephone CO of FIG. 2.

Although labeled and referred to as a 'switch,' the ATM switch 1857 may comprise any routing device capable of receiving from and supplying cells to the interface modules and policing the cells. For example, module 1857 may consist of a token ring carrying ATM cells, and the nodes of the ring would process and police the cells as necessary to achieve the desired routing between interface modules. The packet switch 1858 would typically be a small capacity X.25 compatible time division switch. The voice switch 1859 would be a small capacity digital voice switch, similar to the switch module of a digital PBX. Alternatively, a single digital switch may perform the routing functions of both the packet switch 1858 and the voice switch 1859.

The administrative module 1855 includes an administrative module processor 1861, which is a computer equipped with disc storage 1863, for overall control of the HDT operations. The disc storage 1863 stores translation tables to permit routing of voice, data and broadband information to customer premises devices. The disc system 1863 also stores subscriber profile information and may store channel mapping tables, as discussed in more detail below. The administrative module processor 1861 communicates with and controls the interface modules 1851, 1852 and the switches 1857, 1858, 1859. A CCIS terminal 1873 and an associated data unit 1871 provide a signalling link between the administrative module processor 1861 and an SS#7 network connection to an STP or the like (see FIG. 1A), for facilitating call processing signal communications with the CO's, the ATM switch and the ISCP 40. The CCIS terminal 1873 and the data unit 1871 or an additional terminal and data unit (not shown) provide communications between the administrative module 1855 and the billing system 15 (FIG. 1B).

As illustrated in FIG. 4, the administrative module 1855 also includes a call store 1867 and a program store 1869. Although shown as separate elements for convenience, the call store and the program store are typically implemented as a memory elements within the computer serving as the administrative module processor 1861. For each broadband, packet data or voice call in progress, the call store 1867 stores translation information retrieved from disc storage 1863 together with routing information and any temporary information needed for processing the call. For example, for a broadcast video service, the call store 1867 would receive and store channel mapping information indicating the trunk fiber and the ATM virtual circuit on the trunk fiber for each broadcast service and information identifying the broadband channel in the fiber pair 190 assigned to the DET from which the channel request originated. The program store 1869 stores program instructions which direct operations of the computer serving as the administrative module processor.

3. Call Processing

A central office switching system or CO shown in FIGS. 1A and 1B normally responds to a telephone service request on a local communication line connected thereto, for example an off-hook followed by dialed digit information, to selectively connect the requesting line to another selected local communication line, e.g. to establish a voice call communication link from telephone station A to telephone station B (FIG. 1A). The connection can be made locally through only the connected central office switching system. For example, for a voice telephone call from station A to station B, the SSP-CO 11 provides the call connection without any connection to another central office. When the called line connects to a distant station, for example when station A calls station C, the voice connection is made through the connected central office switching system SSP-CO 11 and at least one other central office switching system SSP-CO 17 through the telephone trunks interconnecting the two central office switches.

In the normal plain old telephone service (POTS) type call processing, the central office switching system (CO) responds to an off-hook at one of the telephone stations and receives dialed digits from the calling station. The central office switching system analyzes the received digits to determine if the call is local or not. If the called telephone station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office. For example, for a call from station A to station C the query would go from originating SSP-CO 11 to terminating SSP-CO 17. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices (and/or tandem offices) of the network between the calling and called stations. The receiving central office then provides a ringing signal to the called station and sends ringback tone back through the connection to the calling station.

The call processing routines discussed above are similar to those used in existing networks to complete calls between telephone stations. In an integrated voice, packet data and broadband AIN type network in accord with the present invention, these normal call processing routines would still be executed for completion of POTS calls and packet data calls not requiring AIN processing.

In an Advanced Intelligent Network (AIN) type system, such as shown in FIGS. 1A and 1B, certain telephone and packet calls receive specialized AIN type processing under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from disc memory 63, an SSP-CO will detect such triggering events during processing of calls to or from such AIN service subscribers.

The SSP type CO switches can recognize a variety of events as triggers for activating a query and response type AIN interaction with the ISCP. A number of different AIN triggers are used, such as off-hook immediate, off-hook delay, dialed number, termination attempt, private dialing plan, etc., depending on the precise type of service the AIN will provide a particular subscriber. For example, if a subscriber has a speech responsive autodialing service for telephone calls, an off-hook immediate trigger might be stored in the translation table file for that subscriber in the SSP-CO. The SSP-CO would detect the trigger each time the subscriber goes off-hook on that line and then attempt to obtain further instructions from the ISCP. The ISCP would instruct the SSP-CO to route the out-going call to a network node having speech recognition capabilities. Similar triggers are detectable by the CO's during packet data call processing, and similar triggers are detectable by SSP type HDT's and the SSP type ATM switch during voice, packet data and/or broadband call processing.

For ordinary voice grade telephone service calls, there would be no event to trigger AIN processing; and the HDT's, the local office switches and toll office switches would function normally and process such calls as discussed above, without referring to the SCP database for instructions. In a typical AIN telephone call processing mode of operation, an SSP type office (CO or tandem) which detects a trigger will suspend call processing, compile a TCAP formatted call data message, and forward that message via a common channel interoffice signalling (CCIS) link and STP(s) to the ISCP 40 which includes the SCP database 43. The ISCP accesses its stored MSAP data tables to translate the received message data into a call control message and returns the call control message to the office of the network via CCIS link and STP(s). The SSP then uses the call control message to complete the particular call through the network.

In a first embodiment of processing of broadband calls or service requests for broadcast services, the SSP-HDT 180 treats all broadcast channel requests as AIN triggers. Input of a broadcast channel request would appear similar to an off-hook delay type trigger, used for certain types of AIN processing for voice telephone calls.

When a subscriber selects a broadcast channel, the administrative module processor 1861 within the HDT 180 would recognize the channel selection as a trigger and suspend call processing. The SSP-HDT 180 then compiles a TCAP formatted call data message and forwards that message via a common channel interoffice signalling (CCIS) link and STP(s) to the ISCP 40 which includes the SCP database 43. The TCAP call data message would identify the subscriber and the particular one of the subscriber's DET's 217 from which the request originated and would include at least the input digits representing the broadcast service request, typically the selected channel. The message may identify one of a plurality of broadcast service provider type VIP's accessible through the network, either based on a concurrent VIP selection or on an earlier choice of a broadcast service provider.

The ISCP 40 accesses its stored data tables to translate the received message data into a call control message. For example, the ISCP 40 may determine that the requested channel is a basic service broadcast channel offered by the particular VIP, with no access restrictions, and formulate a message identifying the respective optical fiber 170 and the particular DS-3 and ATM virtual circuit on that fiber which transports the requested program service. The ISCP 40 returns the call control message to the SSP-HDT 180 via CCIS link and STP(s). The SSP-HDT then uses the call control message to complete the particular broadband call. In the basic service example given above, the SSP-HDT 180 would respond by supplying the cell stream for the requested service to the subscriber's DET 217.

As the HDT 180 routes selected channels to the DET's 217, the HDT would accumulate usage data for the subscribers serviced thereby. The HDT 180 would periodically upload such usage data to an appropriate billing system 15 operated by the TELCO. The billing system would maintain data tables for broadcast service charges for services offered by the various broadcast VIP's. Any usage charges for broadcast viewing would appear on the subscriber's telephone bill. The TELCO collects the broadcast viewing charges and splits the collected monies with the various broadcast VIP's, on some agreed percentage basis or the like.

As an alternative to the real time control of broadcast program selection and access by the ISCP 40 for every channel selection in the above processing embodiment, certain relevant control data could be stored in subscriber profile tables in the disc storage 1863 in each HDT 180. With this modification, the broadcast VIP's would provide provisioning data for downloading and storage in the HDT 180, including broadcast channel mapping information and subscriber authorization control information.

The channel mapping information specifies what programs are carried on each ATM virtual circuit, within each DS-3, on each respective optical fiber 170. The administrative module processor 1861 within the HDT 180 accesses the channel mapping information in response to each program selection by a subscriber to route the corresponding ATM cell stream to the requesting DET 217.

The authorization control data would identify each VIP's pay-per-view or premium program services as AIN triggers. The authorization control data may also identify certain channels that the subscriber has identified for restricted access, i.e. not for viewing by children, as AIN triggers. These broadband triggers are similar to dialed number triggers used to trigger certain types of AIN processing for voice telephone calls.

In the alternative processing routine, when a subscriber selects a channel, the administrative module processor 1861 within the HDT 180 would recognize whether or not the channel selection constituted a trigger based on information retrieved from disc storage 1863. If not, the administrative module processor 1861 would instruct the internal ATM switch 1857 and the line interface module servicing the subscriber to route the ATM cells for the selected channel to the subscriber's DET 217, using the channel mapping data in the manner outlined above. However, if the selected channel is some form of restricted service channel, e.g. premium service, pay-per-view, or restricted by designation by the subscriber, then the administrative module processor 1861 would recognize the channel selection as a broadband type AIN trigger.

Upon detecting that the channel selection is a broadband type AIN trigger, the SSP-HDT 180 suspends call processing, compiles a TCAP formatted call data message and forwards that message via a common channel interoffice signalling (CCIS) link and STP(s) to the ISCP 40. The ISCP 40 accesses its data tables stored in SCP database 43 to translate the received message data into a call control message. For example, the ISCP 40 may determine that the requested channel is a premium channel and whether or not the requesting subscriber is currently entitled to receive that service. If so, the call control message would include appropriate instructions to route the cell stream for the requested service to the subscriber's DET 217. The ISCP 40 returns the call control message to the SSP-HDT 180 via CCIS link and STP(s). The SSP-HDT then uses the call control message to complete the particular broadband call by supplying the cell stream for the requested service to the subscriber's DET 217. As the HDT 180 routes selected channels to the DET's 217, the HDT would accumulate usage data for the subscribers serviced thereby. The HDT 180 would upload such usage data to the billing system 15 operated by the TELCO for processing in the manner discussed above.

In either of the broadcast service request processing embodiments, if the data in the SCP data base 43 mandates a PIN routine, before instructing the SSP-HDT 180 to route the cell stream for the selected broadcast channel to the DET, the ISCP 40 would instruct the SSP-HDT 180 to prompt the subscriber and collect digits. The SSP-HDT 180 would transmit a page of text/graphics via the signaling channel to the subscriber's DET requesting input of a code. The subscriber reviews the prompting message and inputs an appropriate number of digits by operating the remote control of the DET 217. In response, the DET 217 transmits a corresponding message upstream through the signaling channel identifying the keys operated by the subscriber in response to the prompt. The SSP-HDT 180 receives the message and relays the identified key digits through the CCIS network (STP's and SS#7 links) to the ISCP 40. The ISCP 40 compares the digits to one or more valid PIN numbers associated with the requesting subscriber and/or the particular broadcast service. If the input digits correspond to a valid PIN, then the ISCP 40 returns a call control message to the SSP-HDT 180 instructing it to proceed with routing of the appropriate ATM cell stream for the requested broadcast service to the subscriber's DET, in the manner discussed above.

In either of the processing embodiments for broadcast video services, if the ISCP 40 determines that the caller should not receive the requested service, e.g because the caller is not a valid subscriber to the requested service or failed to enter a valid PIN, the ISCP will instruct the SSP-HDT 180 to transmit an appropriate denial notice to the subscriber's DET 217. Typically, this notice will take the form of a page of text and/or graphics indicating a denial, the reason for the denial and/or possibly suggesting further options (e.g. to select another service). The SSP-HDT 180 transmits this notice to the DET 217 through the narrowband signaling channel serving that DET, and the DET provides signals to generate a corresponding output display on the associated television set 217'.

Similar routines can control pay-per-view services offered through the broadcast channels. The broadcast VIP would identify certain channels as carrying pay-per-view. Selection of any such channel would trigger AIN processing by the SSP-HDT, either because any channel selection triggers AIN processing or because selection of the particular channel has been designated a trigger by data set up in the translation tables stored in the HDT. In either event, the ISCP 40 would instruct the HDT to prompt the subscriber for an agreement to purchase the channel.

The HDT 180 would transmit a page of text and/or graphics through the signaling channel to the DET 217 for display on the television 217'. This page effectively would request that the caller agree to pay for the requested event. The page may identify the event and the provider or 'VIP'. This page typically will indicate the amount of payment required, and may request input of a specific code or even a PIN as the indication of assent to the purchase. The subscriber reviews the prompting message and inputs an appropriate code digit(s) by operating the remote control of the DET 217. In response, the DET 217 transmits a corresponding message upstream through the signaling channel identifying the key or keys operated by the subscriber in response to the prompt.

The SSP-HDT 180 receives the message and relays the identified keyed input digits through the CCIS network (STP's and SS#7 links) to the ISCP 40. The ISCP 40 processes the digits to determine if the subscriber has assented to purchase the event in a valid manner (e.g. by entering the appropriate code or PIN number associated with the requested event). If assent is valid, then the ISCP 40 returns a call control message to the SSP-HDT 180 instructing it to proceed with routing the cell stream for the pay-per-view event to the subscriber's DET 217 for display on the television 217'. If for some reason, the ISCP determines that the subscriber is not entitled to receive the pay-per-view event, e.g. because of a failure to enter a valid PIN, the ISCP 40 would instruct the SSP-HDT 180 to transmit an appropriate denial message, as outlined above.

Upon actual routing of the pay-per-view event cell stream to the DET 217, the HDT 180 would compile an appropriate billing message identifying the subscriber, the event and the time/date of purchase. The HDT 180 would transmit that message to the billing system 15 for further processing. For example, the system 15 may store data from the pay-per-view service provider indicating the charge for the particular event. The billing system would add that charge to the subscriber's telephone bill. The TELCO would collect payment and would split the money with the provider on some percentage basis agreed to in contract between the TELCO and the provider.

A subscriber requests an interactive communication with a VIP in a manner analogous to going off-hook and dialing a destination on a telephone. When a subscriber activates the DET to initiate an outgoing call to an interactive service provider, the DET 217 first initiates signaling communications with the SSP-HDT 180 indicating the intent to initiate an interactive broadband call. This, in effect, is the broadband "off-hook" signal. The user next activates specific keys on the DET 217 or its associated remote control to identify or "dial" the broadband interactive VIP of choice for purposes of the present call. In response, the user's DET 217 transmits a signal identifying the numbers input by the user upstream to the SSP-HDT 180. The SSP-HDT 180 recognizes the broadband interactive "off-hook" and VIP selection digits as an AIN trigger, essentially similar to an off-hook delay type trigger used on voice grade telephone calls.

At this point in the call, the SSP-HDT 180 suspends call processing, compiles a TCAP formatted call data message and forwards that message via a common channel interoffice signalling (CCIS) link and STP(s) to the ISCP 40 which includes the SCP database 43. This TCAP message identifies the subscriber and the DET 217 and contains the dialed digits identifying the called party VIP. The ISCP 40 accesses its stored MSAP data tables to translate the received message data into a call control message.

The ISCP 40 stores routing control information relating to processing of interactive service calls. For example, the ISCP 40 will store data regarding VIP's and subscribers to identify those subscribers entitled to access each interactive service VIP 400. If this data is related to the particular VIP, the data would list all subscribers permitted access, e.g. those who subscribe to that VIP's services and who are current in their payment of bills. If the data is related to the particular subscriber, the data might indicate that a PIN number functionality is to be applied to access certain VIP's from that subscriber's DET's. If the data specifies a PIN number for accessing the VIP, the ISCP 40 would interact with the SSP-HDT 180 to execute a PIN number procedure of the same type as the PIN number routine discussed above relative to broadcast channel selection.

For simplicity here assume that no PIN number routine is to be applied to this broadband interactive call. The ISCP 40 therefore formulates a call control message containing appropriate instructions to set up the two-way signaling link and the one-way broadband link between the called VIP and the DET 217. Several different procedures can be used to complete the call, and the message formulation procedure executed by the ISCP 40 will vary in a corresponding manner, as will be discussed in more detail below. After formulating the call control message, the ISCP 40 returns that message to the SSP-HDT 180 via CCIS link and STP(s). The SSP-HDT 180 then uses the call control message to establish the requisite ATM broadband link and signaling link between the called VIP's equipment and the subscriber's DET 217.

Once the communication session is set up, the DET 217 can transmit control signaling information upstream through the ONU 210, the HDT 180 and the signaling link to the VIP's level 2 gateway 401, and the level 2 gateway 401 can transmit downstream control signaling information through the corresponding reverse path. For downstream transmission, the server 403 will provide ATM cells with an appropriate header. The ATM switch 410 will route the cells using the header and transmit those cells over fiber 415 to the HDT 180 serving the requesting subscriber. The HDT 180 will recognize the header as currently assigned to the particular DET 217 and will forward those cells through the downstream fiber of pair 190 and the ONU 210 to that DET, in essentially the same manner as for broadcast programming.

When the HDT 180 begins routing ATM broadband cells for the call through to the subscriber's DET, the HDT formulates a message for the billing system 15 identifying the VIP, the subscriber and the start time. The HDT 180 will formulate a similar message to the billing system when the broadband transmissions end and the interactive call is torn down. These messages may be transmitted to the billing system on a real-time basis, as events occur, or the HDT 180 may store the various billing data and periodically upload the messages to the billing system 15 all at once.

Depending on contractual arrangements with the VIP's and/or the subscribers, the interactive connect time may be billed to the VIP's or billed directly to the subscribers. If the VIP's equipment connects to the CCIS network, the level 2 gateway 401 would inform the billing system 15 of subscriber interaction with the VIP's equipment. Consider video on demand as an example. The level 2 gateway could inform the billing system of the type or payment level corresponding to the subscriber selection, and the billing system would add a pre-assigned charge for the video on demand purchase to the subscriber's bill.

As noted above, the SSP-HDT 180 can complete the interactive call in a number of different manners, and the instruction from the ISCP 40 to the SSP-HDT 180 will vary accordingly. In a first call processing technique, the VIP has assigned destination numbers for broadband and packet data service calls, and the ISCP 40 stores these numbers within the MSAP data base maintained within the SCP 43. The ISCP 40 therefore returns a call control message to the SSP-HDT 180 containing both destination numbers, and the SSP-HDT 180 interacts with the ATM switch 410 and the packet data functionality of the CO 17 to establish the parallel broadband and packet data links (here assumed that the initial implementation uses X.25 packet data communication for signaling, whereas future implementations may use ATM signaling which also would go through the ATM switch 410).

Establishment of a broadband communication session or connection through the network between an information service provider 400 and a particular DET 217 requires establishment of a virtual circuit through the ATM switch 410 and the appropriate HDT 180. As noted above in the discussion of FIG. 3, the disc storage 463 within the ATM switch 410 stores data tables defining all possible virtual circuits through the ATM switch to each terminal of a customer subscribing to a particular provider's services. These data tables define the ATM header information (VCI/

VPI) and the particular fiber output needed to route cells to the correct HDT 180 and the time slot information on the downstream fiber to the appropriate ONU 210 serving each DET 217. In the first call completion scenario, the HDT 180 would forward the destination number of the VIP to the ATM switch 410, and that switch would establish the broadband link between an available port to the VIP's file server and the HDT 180.

Specifically, the ATM switch 410 would identify an available port and the DS-3 and VCI/VPI of an available virtual circuit on the fiber to the HDT and would instruct the HDT 180 to route cells having VCI/VPI identifiers corresponding to that virtual circuit from the DS-3 on the fiber 415 to the time slot assigned to the subscriber's DET 217 on the fiber of pair 190 going to the ONU 210 servicing that subscriber. The ATM switch 410 would also inform the VIP's equipment of the broadband call and instruct the VIP's equipment to transmit broadband information relating to the call through an identified available port and with the assigned VCI/VPI header information. The X.25 signaling call simultaneously would be completed in an analogous manner through the CO 17.

As an alternative to the above procedure for establishing the call, the ISCP 40 can communicate with the various network components to identify available ports and virtual circuits and provide more specific instructions to the HDT and the other components to complete the call. With this approach, when the ISCP 40 receives the call data message from the SSP-HDT 180, the ISCP queries the VIP's level 2 gateway 401 and/or the ATM switch 410 to identify an available port on the VIP's broadband file server 403. The ISCP 40 then instructs the ATM switch 410 to define a currently available virtual circuit for carrying ATM cells from the server port, through the network to the subscriber's DET 217. The ATM switch identifies the virtual circuit to the ISCP 40 by its VCI/VPI and the DS-3 on the fiber 415 which will carry that virtual circuit. The ATM switch 410 also locks up the portion of that virtual circuit through the switch and the fiber 415 to the particular HDT 180. The ISCP instructs the VIP's equipment to transmit broadband information relating to this interactive session from the identified port using the assigned VCI/VPI header information. All transmitted cells from the server port are routed through to the DS-3 on the fiber 415 with appropriate VCI/VPPI header information. The ISCP 40 would similarly instruct the various network components to set up the associated signaling link.

In this call completion scenario, when the ISCP 40 formulates the call control message for transmission to the SSP-HDT 180, that message contains the assigned VCI/VPI and an identification of the DS-3 transporting that virtual circuit communication. In response to this message, the HDT 180 begins routing ATM cells bearing the assigned VCI/VPI header information from the DS-3 to the time slot assigned to the DET 217 on the downstream fiber of pair 190 and the ONU 210 to that DET, in essentially the same manner as for broadcast programming.

During a packet data call to equipment 218 or an interactive broadband call to a VIP 400, the network may determine that the call can not be completed to the called destination, e.g. because all of the ports to the called destination are busy. In such a case, the SSP servicing the particular destination would transmit a notification back to the SSP-HDT 180 through the CCIS link(s) and STP(s). In response, the HDT 180 transmits a "busy" or "call can not be completed" message to the DET 217 through the signaling channel. Typically, this notice will take the form of a page of text and/or graphics indicating the failure to complete the call, the reason for the failure (e.g. busy or equipment fault) and/or possibly suggesting further options (e.g. to select another service). The DET 217 provides signals to generate a corresponding output display on the associated television set 217'.

The AIN processes requests for packet data calls in a manner substantially similar to the AIN processing of voice and broadband service requests discussed above. The use of the database in the central controller, the ISCP, allows subscribers to extensively customize their services, including packet data services.

For example, a customer might subscribe to a home banking service. As part of the provisioning of this service for the customer, the TELCO would identify a key or sequence of keys on the subscriber's DET 217 or the associated remote control to initiate a request for "banking" communications services. The TELCO would also obtain identification of the subscriber's bank, and based on that information, determine the type of communication that bank uses, e.g. packet data, voice only, or a combination of broadband and signaling. For purposes of this example, assume that the bank utilizes packet data communications. The TELCO would also identify a communication link to the bank's equipment. Depending on the bank's own security procedures, the TELCO may also apply a PIN number access procedure on calls to the particular bank's data equipment. If so, then the TELCO would assign or obtain from the subscriber a PIN number. The information regarding the subscriber, the bank and any PIN number is stored in an appropriate data table in the ISCP 40. Also, an appropriate trigger is set in the subscriber profile data stored within the SSP-HDT 180 servicing the particular subscriber.

Subsequently, when the user activates the "banking" key(s) on the DET 217 or its remote control, the SSP-HDT 180 would receive the corresponding message from the DET and recognize that message as an AIN triggering event. The SSP-HDT 180 suspends call processing and transmits an appropriate query message in TCAP format to the ISCP 40. This message includes an identification of the subscriber and/or the subscriber's DET 217 and information indicating the subscriber requested "banking" services. The ISCP accesses the subscriber's data table in the MSAP data base within the SCP 43 to identify the subscriber's bank. The information in the subscriber's data table may identify the bank's type of communication or the SCP 43 may look into the bank's data table in the MSAP data base to determine the relevant type of communication. Assuming here for simplicity that no PIN number routine is required at this point, the ISCP 40 returns a call control type TCAP message to the SSP-HDT 180 instructing it to proceed with a call to the bank's equipment. In the example given, this entails establishing a packet data call between the bank's data equipment and the subscriber's DET 217.

Assuming that the bank's packet data equipment corresponds to terminal 218 shown in FIG. 1A, the packet data call would go through an HDT 180 and CO's 17 and 11. Although shown only as a personal computer (PC) type terminal device, the bank's packet data equipment may consist of any appropriate packet communication device. For example, the device 218 may provide an interface to an internal packet data network or a local area network that the bank maintains for its real time processing of automatic teller machine operations.

If the data in the data base 43 mandates a PIN routine, before instructing the SSP-HDT 180 to complete the call to the bank, the ISCP 40 would instruct the SSP-HDT 180 to prompt the subscriber and collect digits. The SSP-HDT 180 would transmit a page of text/graphics via the signaling channel to the subscriber's DET requesting input of a code. The subscriber reviews the prompting message and inputs an appropriate number of digits by operating the remote control of the DET 217. In response, the DET 217 transmits a corresponding message upstream through the signaling channel identifying the keys operated by the subscriber in response to the prompt. The SSP-HDT 180 receives the message and relays the identified key digits through the CCIS network (STP's and SS#7 links) to the ISCP 40. The ISCP 40 compares the digits to one or more valid PIN numbers associated with the requesting subscriber. If the input digits correspond to a valid PIN, then the ISCP 40 returns a call control message to the SSP-HDT 180 instructing it to proceed with completion of the call to the bank's equipment in the manner discussed above.

For other banks offering voice and DTMF type interfaces for banking services and/or banks offering broadband downstream and two-way signaling interfaces similar to those used for video services, the AIN would utilize techniques similar to those described in the above packet data example to route the subscriber's call to the appropriate equipment operated by each subscriber's bank. For example, if the bank equipment connects to a dial up telephone line for callers using standard telephone sets, the information from the ISCP 40 might instruct the SSP-HDT 180 and one the CO 11 or 17 serving the bank's line to ring both lines simultaneously and provide a voice grade connection when both parties answer. The bank may choose to connect a live operator or an automated voice response system to the voice grade line.

For those subscribers using two or more banks, the ISCP could recognize this fact as part of its processing of the first query and instruct the SSP-HDT 180 to prompt the subscriber for input of a selection of a specific one of the subscriber's banks, in a manner similar to obtaining a PIN number input. Once the subscriber identified the specific bank and that information reached the ISCP 40, call processing would continue as outlined above.

The central control through the ISCP 40 also permits broadband service providers to offer a variety of new customized services through the other communications media (voice and packet data) in combination with their broadband services. For example, a VIP broadcasting a home shopping channel might subscribe to an 800 number for dial up ordering of products offered on that channel. In areas not serviced by the inventive network, viewers would dial the 800 number in the usual manner to order products.

In the inventive network, however, the subscriber would activate the remote control or the keypad on the DET 217 indicating an intent to communicate with the vendor. The DET would send an appropriate signaling message to the HDT 180 identifying the subscriber input. The SSP type HDT 180 would recognize the input as an AIN type trigger event. The SSP-HDT suspends call processing, compiles a TCAP formatted call data message and forwards that message via the common channel interoffice signalling (CCIS) link and STP(s) to the ISCP 40 which includes the SCP database 43. The TCAP call data message identifies the subscriber and the subscriber's terminal and includes the subscriber input information and data identifying the broadband channel currently being viewed.

The ISCP 40 accesses its stored data tables to translate the received message data into a call control message. In this case, the ISCP recognizes the vendor from the particular channel the subscriber is viewing and recognizes the input as a request for a call to that vendor. The ISCP accesses the data file for the identified vendor to identify the destination number for that vendor (this may require first retrieving the 800 number and translating that number into an actual destination number). The ISCP formulates the call control message to instruct the SSP-HDT 180 to set up a voice call between the subscriber's telephone and the vendor. In part, the message will include both the vendor's telephone number and the subscriber's telephone.

The ISCP 40 returns the call control message to the SSP-HDT 180 via CCIS link and STP(s). The SSP then uses the call control message to signal the CO 17 to initiate a voice call through the network to the vendor's telephone line, e.g. to ring station C shown in FIG. 1A, and to concurrently ring the subscriber's telephone station D. Normal voice grade telephone communication begins when both parties answer their respective telephone stations. The vendor may have a live operator answer, or some automated voice response system may answer and process the viewer's call. In this call processing scenario, the SSP-HDT signaled the CO 17, however, as an alternative, the ISCP 40 could provide an appropriate instruction message to that CO at the same time that it returned the call control message to the SSP-HDT 180.

A similar procedure can be used to set up a parallel telephone or packet data call while a subscriber is viewing a broadcast program. For example, the AIN processing might recognize activation of certain keys on the DET or remote control as a "PIZZA" call and establish a packet data link from the DET to packet data equipment operated by the viewer's previously specified preferred pizza delivery company. If the subscriber had not previously identified a pizza delivery company, the AIN would provide prompts and collect inputs (similar to a PIN number routine discussed above) to allow the viewer to select a delivery company serving the viewer's geographic location.

The above discussion of call processing for packet switched data and broadband calls has concentrated on processing of outgoing calls because, in the initial embodiment, broadband services are selected only from the user's location, to insure privacy and prevent dumping of 'junk mail' advertisements on viewers through the broadband and packet data network services. In future, however, VIP's will also initiate broadband and packet data calls to individual subscribers. All such incoming calls would receive AIN type processing. This enables subscribers to specify what types of broadband calls they will accept and/or from what VIP's they will accept incoming broadband or packet data calls, and the ISCP data tables will limit incoming calls accordingly.

Although several preferred embodiments of the invention have been described in detail above, it should be clear that the present invention is capable of numerous modifications as would be apparent to one of ordinary skill in the art. Such modifications fall within the purview of the appended claims.

I claim:

1. An integrated communication system, comprising:

a telephone central office switching system selectively providing switched telephone call communications services to a plurality of telephone stations coupled thereto and detecting triggering events during processing of certain telephone calls;

a local router selectively providing switched telephone call communications services to a plurality of telephone stations coupled thereto and selective broadband digital services to a plurality of digital terminals coupled thereto and detecting triggering events during set up of at least some of the selective broadband digital services;

a telephone trunk circuit coupling the telephone central office switching system to the local router;

a broadband trunk circuit supplying broadband digital service signals to the local router;

a central data base, separate from the telephone central office switching system and the local router, storing data for generating control signals for controlling at least some of the telephone call communications services provided by the telephone central office switching system and at least some of the selective broadband digital services provided by the local router; and a signaling communication system, separate from the trunk circuits, said signaling communication system carrying two-way signaling data between the central data base and the telephone central office switching system and between the central data base and the local router, wherein said telephone central office switching system and said local router each obtain control signals from said central data base via the signaling communication system in response to detection of triggering events.

2. A network as in claim 1, further comprising a source which broadcasts digitized and compressed video programs over the broadband trunk circuit as said broadband digital service signals.

3. A network as in claim 1, further comprising a broadband switch providing selective broadband digital communications from interactive broadband service providers equipment through the broadband trunk circuit to the local router, wherein the broadband switch communicates with the central data base via the signaling communication system and the data stored in the central data base controls at least some operations of the broadband switch.

4. An integrated communication system, comprising:

a switching means for selectively providing switched telephone call communications services to a plurality of telephone stations coupled thereto and for selectively providing packet switched data call communications services to a plurality of data devices coupled thereto;

a local router for selectively providing switched telephone call communications services, switched packet data services and broadband digital services to a plurality of customer premises devices coupled thereto;

at least one trunk circuit coupling the local router to the switching means;

a broadband digital services trunk circuit supplying broadband digital service signals to the local router;

a central data base, separate from the switching means and the local router, storing data for generating control signals for controlling at least some telephone switching operations and data packet switching operations of the switching means and at least some operations of the local router; and a signaling communication system, separate from the trunk circuits, said signaling communication system carrying messages to the central data base from the switching means and the local router and control signals from the central data base to the switching means and the local router, wherein the switching means comprises a telephone switch and a packet data switch.

5. A network as in claim 4, further comprising a broadband switch selectively providing broadband digital service signals from interactive broadband service providers equipment through the broadband digital services trunk circuit to the local router, wherein the broadband switch communicates with the central data base via the signaling communication system and the data stored in the central data base controls at least some operations of the broadband switch.

6. A network as in claim 5, wherein the broadband switch is an Asynchronous Transfer Mode switch.

7. A network as in claim 4, further comprising:

a multiplexed line carrying broadband service signals for services selected by a plurality of subscribers served by the local router, telephone signals for the plurality of subscribers and packet data signals for the plurality of subscribers from the local router; and means for coupling the telephone signals to telephone stations on the premises of the plurality of subscribers and for coupling the broadband service signals and packet data signals on the multiplexed line to at least one terminal on premises of each of the plurality of subscribers.

8. In a system comprising:

a broadband communication network selectively providing broadband communications links;

a plurality of information servers connected to the broadband communication network, each information server being capable of transmitting broadband digital information via a broadband communication link through the broadband communication network;

a plurality of terminals for transmitting control signals upstream through the broadband communication network in response to user inputs and for providing displays in response to information received through the broadband communication network;

a plurality of telephone switching offices;

a central control separate from the telephone switching offices for controlling at least some operations of each telephone switching office, a method comprising the steps of:

receiving a selection signal representing selection of a broadband service from one of the terminals at a node of the broadband communication network;

in response to the selection signal, accessing data stored in the central control to generate broadband control instructions; and utilizing the accessed data to control an operation of the broadband communication network to enable the one terminal to receive broadband digital information from a predetermined one of the information servers which provides the selected service.

9. A method as in claim 8, wherein: the accessing step comprises:

(1) recognizing the selection signal received as a triggering event;

(2) transmitting a query from the node of the broadband communication network to the central control, said query containing data identified by the selection signal and information regarding origin of the selection signal;

(3) translating the query into a call control message containing the broadband control instructions based on a portion of the stored data; and (4) transmitting the call control message back to the node of the broadband communication network; and the utilizing step comprises controlling the broadband communication network in response to the call control message.

10. A method as in claim 8, further comprising:

receiving another selection signal representing selection of another broadband service from another terminal at the node of the broadband communication network;

in response to said another selection signal, accessing data stored in the node; and utilizing the data accessed in the node to control another operation of the broadband communication network to enable said another terminal to receive broadband digital information from another predetermined one of the information servers which provides said another broadband service.

11. A method as in claim 10, wherein:

the service selected by and provided to the one terminal is a premium video broadcast service available to a limited number of broadband service subscribers; and the service selected by and provided to said another terminal is a basic video broadcast service available to all of the broadband service subscribers.

12. A method as in claim 10, wherein:

the service selected by and provided to the one terminal is a pay-per-view video broadcast service; and the service selected by and provided to said another terminal is a basic video broadcast service available to all of the broadband service subscribers.

13. A method as in claim 10, wherein:

the service selected by and provided to the one terminal is a point to point interactive communication with a control device and a broadband server operated by an interactive broadband service provider; and the service selected by and provided to said another terminal is a video broadcast service.

14. A method as in claim 13, wherein the control device and the broadband server provide a video on demand service.

15. A switching apparatus, comprising:

at least one trunk interface to a public switched telephone network;

at least one trunk interface to a switching system;

at least one line and at least one line interface to a distribution system;

a central control, accessible over a signalling system, containing both telephone and broadband routing instructions for switching of signals between at least one trunk interface and at least one line interface;

a processor recognizing an event relating to selection of a broadband service as a trigger controlling the switching system; and a signaling communication device responsive to the processor for obtaining instructions from said central control instructing the processor how to control at least one broadband switching operation of the switching system in response to the trigger over said signalling system.

16. A switching apparatus as in claim 15, wherein:

the at least one trunk interface to a public switched telephone network interfaces at least one telephone trunk from a telephone switching office and the at least one trunk interface to a switching system interfaces at least one asynchronous transfer mode broadband trunk; and said switching system comprises:

(1) means, controlled by the processor, for selectively providing two-way routing of telephone signals between the telephone trunk and the at least one line interface, and (2) means, controlled by the processor, for selectively routing broadband information received in Asynchronous Transfer Mode cells on the broadband trunk to the at least one line interface.

17. A switching apparatus as in claim 16, wherein said broadband switching system further comprises means, controlled by the processor, for providing packet switched data communications between the at least one trunk interface and the at least one line interface.

18. A switching apparatus as in claim 15, wherein the signaling communication device comprises means for providing the processor with two-way data communication capabilities over a common channel interoffice signaling network of the public switched telephone network.

19. A broadband switching system, comprising:

at least one trunk and at least one trunk interface to a public switched telephone network;

at least one trunk and at least one trunk interface to a broadband switching fabric;

at least one line and at least one line interface to a distribution system;

a central control containing both telephone and broadband routing instructions for controlling connection between the at least one trunk interface and the at least one line interface;

a processor recognizing an event relating to selection of service from said distribution system as a trigger event and controlling the broadband switching fabric; and a signaling communication device responsive to the trigger event for obtaining instructions from said central control instructing the processor how to control the broadband switching fabric in response to the trigger event.

20. A broadband switching system as in claim 19, wherein the signaling communication device comprises means for providing the processor with two-way data communication capabilities over the common channel interoffice signaling network of the public switched telephone network.

21. A broadband switching system as in claim 19, wherein the broadband switching fabric comprises an Asynchronous Transfer Mode routing system.

22. In a system comprising:

a broadband communication network selectively providing broadband programming to subscribers;

a plurality of telephone switching offices;

a central control separate from the telephone switching offices for controlling at least some operations of each telephone switching office, a method comprising the steps of:

transmitting video programming signals through the broadband communication network to a subscriber's terminal to display information about a service having at least one associated telephone number;

in response to an input from the subscriber, transmitting a message to a node of the broadband network;

transmitting a query from the node to the central controller, said query identifying the subscriber and the transmitted video signals;

in response to the query, identifying a destination telephone number assigned to a provider of the service and a telephone number assigned to the subscriber;

ringing a telephone station corresponding the destination telephone number assigned to the provider of the service and a telephone station corresponding to the telephone number assigned to the subscriber.

23. A method as in claim 22, further comprising providing a telephone communication between both telephone stations upon answering at both telephone stations.

24. A method as in claim 22, wherein the step of transmitting the video programming signals comprises:

broadcasting the video programming signals and other broadband programming signals to the node of the broadband network and to at least one other node of the broadband network; and selectively routing the video programming signals from the node to the subscriber's terminal.

25. A method as in claim 24, wherein:

the step of transmitting the video programming signals further comprises including in the broadcast video programming signals an indication of a virtual telephone number associated with the service so as to display the virtual telephone number to the subscriber; and the step of identifying a destination telephone number assigned to a provider of the service comprises accessing data stored in the central control to translate the virtual telephone number into a telephone number assigned to a telephone station operated by the provider.

26. A method as in claim 22, wherein the step of transmitting the video programming signals comprises transmitting digitized and compressed video data.

27. A method as in claim 26, wherein the step of transmitting digitized and compressed video data comprises mapping packets of digitized and compressed video data into asynchronous transfer mode cells and transmitting the cells through the broadband network to the terminal.

28. A method as in claim 27, wherein the step of transmitting the cells comprises:

broadcasting the cells to the node of the broadband network and to at least one other node of the broadband network; and selectively routing the video programming data in the cells from the node to the subscriber's terminal.

29. A method as in claim 28, wherein the step of selectively routing the video programming data in the cells from the at least one other node to a subscriber's terminal comprises:

selectively routing the cells from the at least one other node to one of a plurality of subscriber's terminals; and processing the cells to extract the video programming data.

30. An integrated communication system, comprising:

a plurality of telephone central office switching systems each selectively providing switched telephone call communications services to a plurality of telephone stations coupled thereto and detecting triggering events during processing of certain telephone calls;

telephone trunk circuits coupling the telephone central office switching systems to each other;

a central data base, separate from the telephone central office switching systems, having a central control and storing data for generating control signals;

a signaling communication system, separate from the trunk circuits, said signaling communication system carrying two-way signaling data between the central data base and the telephone central office switching systems;

a plurality of local routers, each local router comprising:
 (1) a trunk interface,
 (2) a line interface,
 (3) an internal switching system providing telephone and broadband switching of signals between the trunk interface and the line interface of the local router,
 (4) a signaling communication device for two-way data communication with the central control via the signaling communication system,
 (5) a router control processor recognizing an event relating to selection of a broadband service as a trigger, obtaining instructions from the central control and controlling the internal switching system in response to the instructions;

telephone trunk circuits coupling the local routers to telephone central office switching systems;

a broadband switch system, comprising:
 (a) at least one trunk interface,
 (b) at least one line interface,
 (c) a broadband switch fabric selectively routing broadband signals between the at least one trunk interface and the at least one line interface of the broadband switch system,
 (d) a signaling communication device for two-way data communications with the central control via of the signaling communication system, and
 (e) a broadband switch processor recognizing an event relating to selection of service through the broadband switch system as a trigger, obtaining instructions from the central control and controlling the broadband switch fabric in response to the instructions;

broadband trunk circuits supplying broadband digital service signals from the broadband switch to the local routers;

a broadcast source of broadband digital service signals; and a broadband trunk network broadcasting broadband digital service signals from the broadcast source to all of the local routers.

* * * * *